United States Patent
Ichikawa et al.

(10) Patent No.: US 7,260,733 B2
(45) Date of Patent: Aug. 21, 2007

(54) DISTRIBUTED CONTROL SYSTEM

(75) Inventors: Takahiro Ichikawa, Aichi-ken (JP); Takashi Nakano, Anjo (JP); Shinichi Hayashi, Anjo (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 11/433,530

(22) Filed: May 15, 2006

(65) Prior Publication Data

US 2006/0259231 A1 Nov. 16, 2006

(30) Foreign Application Priority Data

May 13, 2005 (JP) ............................. 2005-141726

(51) Int. Cl.
- G06F 1/04 (2006.01)
- G06F 15/16 (2006.01)
- G06F 3/00 (2006.01)
- G06F 7/00 (2006.01)
- G06F 17/00 (2006.01)
- G06F 19/00 (2006.01)
- H04L 7/00 (2006.01)

(52) U.S. Cl. ..................... 713/375; 340/3.2; 340/681; 340/825.2; 340/870.14; 701/105; 700/2; 700/19; 700/20; 700/306; 702/89; 710/61

(58) Field of Classification Search ............. 340/146.2, 340/500, 501, 517, 523, 526, 681, 3.2, 825.2, 340/870.14; 701/1, 2, 36, 48, 101, 102, 105, 701/114; 700/2–4, 8, 9, 11, 12, 14, 19, 20, 700/306; 702/57, 79, 89, 104, 176; 713/375, 713/400; 709/248; 710/61

See application file for complete search history.

(56) References Cited

U.S. PATENT DOCUMENTS

| | | | | |
|---|---|---|---|---|
| 5,339,782 A * | 8/1994 | Golzer et al. | ................ | 123/399 |
| 6,135,577 A * | 10/2000 | Ishii | ........................ | 303/114.1 |
| 6,711,472 B2 * | 3/2004 | Mencher et al. | ................ | 701/1 |
| 6,757,608 B2 * | 6/2004 | Gross et al. | ................. | 701/115 |
| 7,181,644 B2 * | 2/2007 | Millsap et al. | ................. | 714/11 |
| 2006/0235601 A1 * | 10/2006 | Uruno et al. | ................ | 701/102 |

FOREIGN PATENT DOCUMENTS

| | | |
|---|---|---|
| JP | 05-268664 | 10/1993 |
| JP | 2002-206454 | 7/2002 |
| JP | 2002-342869 | 11/2002 |

\* cited by examiner

*Primary Examiner*—Crystal J. Barnes
(74) *Attorney, Agent, or Firm*—Nixon & Vanderhye P.C.

(57) ABSTRACT

In a distributed control system, a first electronic control unit sends trigger information to a second electronic control unit. The trigger information includes a timing that triggers the second electronic unit to obtain second sensor information from a second sensor. The second electronic control unit is designed to receive the trigger information, and obtain, at the timing of the trigger information, the second sensor information from the second sensor. The second electronic unit is configured to send, to the first electronic control unit, the obtained second sensor information.

19 Claims, 12 Drawing Sheets

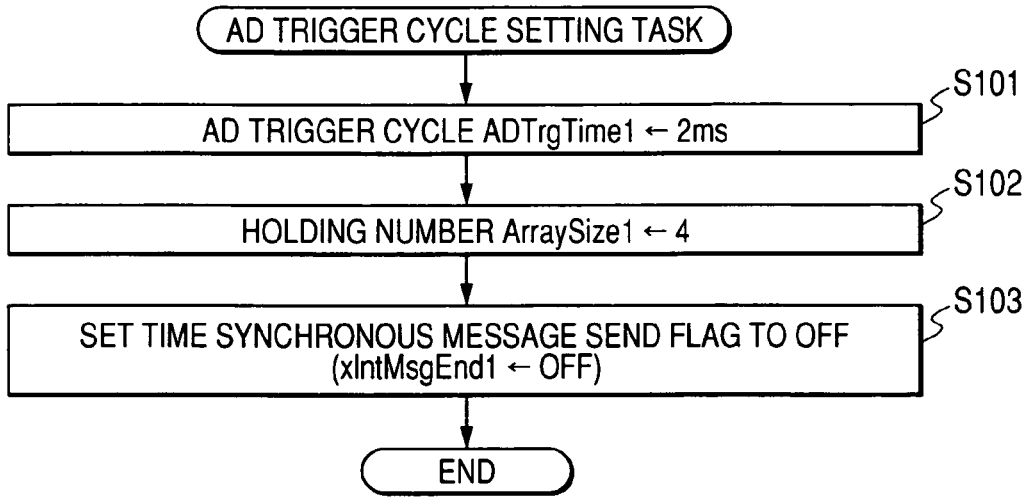
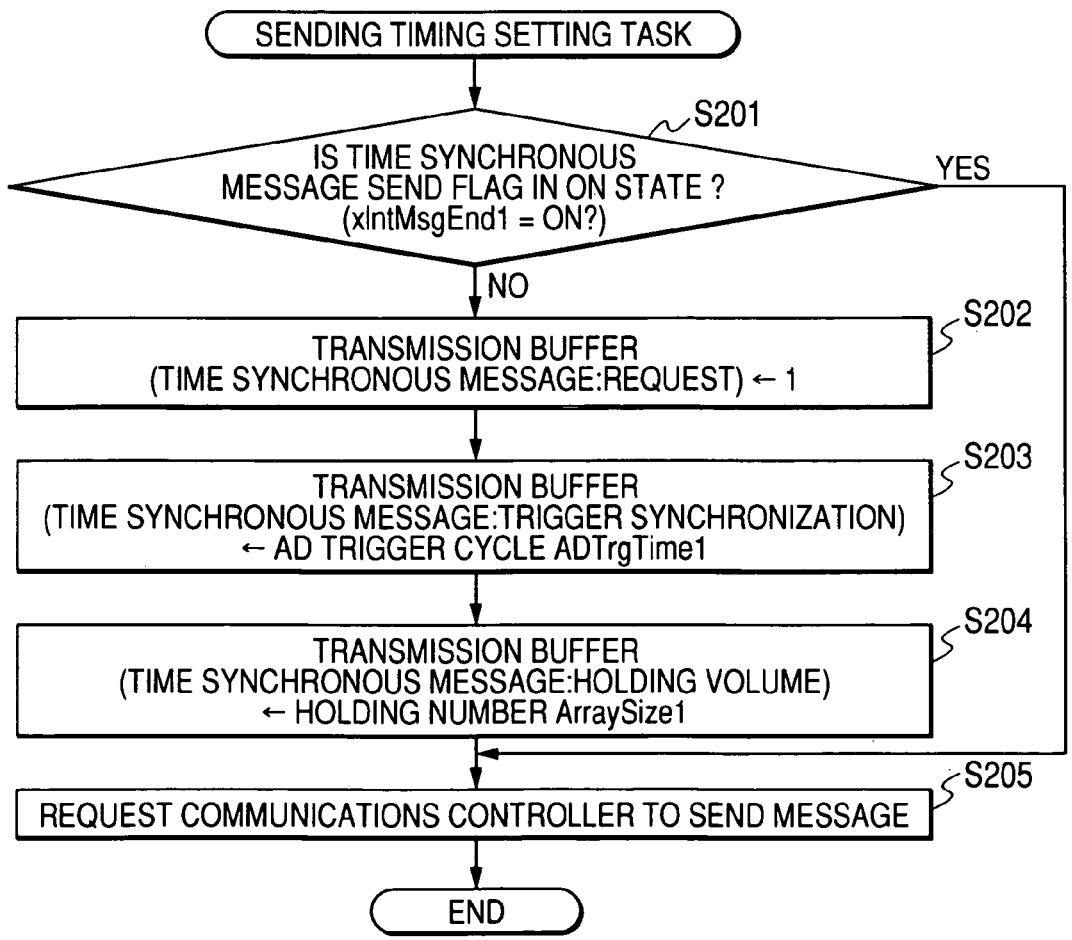

DISTRIBUTED CONTROL SYSTEM

CROSS REFERENCE TO RELATED APPLICATIONS

This application is based on Japanese Patent Application 2005-141726 filed on May 13, 2005. This application claims the benefit of priority from the Japanese Patent Application, so that the descriptions of which are all incorporated herein by reference.

FIELD OF THE INVENTION

The present invention relates to a distributed control system including a plurality of electronic control units communicably linked to each other, which are capable of executing distributed control tasks using pieces of sensor information obtained from a various types of sensors.

BACKGROUND OF THE INVENTION

With in-vehicle devices, such as a transmission, an air conditioner, and so on, being highly advanced, a large number of electronic control units constituting a conventional vehicle control system have been installed in a vehicle. These electronic control units, referred to simply as ECUs, are distributedly located to individually control corresponding predetermined target devices included in the in-vehicle devices.

A various types of sensors have been installed in the vehicle for measuring (monitoring) physical properties associated with the in-vehicle devices; these physical properties are required for ECUs to control the in-vehicle devises.

For example, if first and second ECUs designed to control first and second in-vehicle devices as targets, respectively, the first ECU is electrically connected to a first sensor for measuring a physical property associated with the first target device. Similarly, the second ECU is electrically connected to a second sensor for measuring a physical property associated with the second target device.

When the physical properties are input, as first and second pieces of sensor information (monitor information), from the first and second sensors to the first and second ECUs, respectively, the first and second ECUs are configured to individually control the first and second in-vehicle devices based on the first and second pieces of sensor information, respectively.

In such a conventional vehicle control system, the ECUs are communicatively linked to each other through a CAN (Controller area Network; in other words, CAN bus) as an example of multiplex networks. The CAN allows the ECUs to share, through the multiplex network, pieces of sensor information to be required to the individual controls. An example of the conventional vehicle control systems using the CAN is disclosed in the U.S. Pat. No. 6,711,472 B2 corresponding to Japanese Unexamined Patent Publication No. 2002-206454.

In conventional distributed control systems such as the vehicle control systems, the structure and/or functions of an ECU can be updated in accordance with installability and cost. For example, the wiring configuration of ECUs of a vehicle control system with respect to sensors thereof is changed such that one of two sensors to which an ECU was connected is connected to another ECU. Even if this change is subjected to the vehicle control system, the ECU can indirectly take, via the CAN from another ECU, a piece of sensor information to be required to control a target device associated with the one of the two sensors. This allows the ECU to basically maintain the control function for a target device associated with the one of the two sensors; this control function is substantially equivalent to that of the ECU whose wiring configuration is unchanged.

In such a vehicle control system, if an ECU whose wiring configuration has been changed is designed to control a target device using pieces of sensor information whose measured timings are synchronized with each other (kept in phase with each other), the following significant disadvantage may appear in the vehicle control system. Note that, as such an ECU requiring time-synchronized pieces of sensor information, there is an ECU for controlling intake airflow based on pieces of sensor information synchronously measured respectively by an intake throttle-position sensor and an intake stroke sensor.

Specifically, even though the ECU allows, via the CAN, for sharing of pieces of sensor information obtained by an other ECU to which an intake throttle-position sensor and/or an intake stroke sensor are connected, the obtained timings of the pieces of sensor information may not coincide with each other. This may not ensure the synchronism between the pieces of sensor information.

In this regard, the vehicle control system disclosed in the U.S. Patent Publication No. 6,711,472 B2 cannot solve the disadvantage set forth above because it aims at synchronization between an ECU and sensors connected thereto, and therefore does not focus on synchronism of pieces of sensor information to be obtained from sensors connected to different ECUs, respectively.

SUMMARY OF THE INVENTION

In view of the background, an object of at least one aspect of the present invention is to obtain pieces of sensor information to be monitored by sensors connected respectively to different ECUs of a distributed control system while keeping the synchronism between the obtained pieces of the sensor information.

According to one aspect of the present invention, there is provided a distributed control system. The distributed control system includes a first electronic control unit connected to a first sensor and configured to obtain first sensor information therefrom for execution of allocated control. The distributed control system also includes a second electronic control unit connected to a second sensor and configured to obtain second sensor information therefrom for execution of allocated control. The first and second electronic control units are communicably linked to each other. The first electronic control unit is configured to send trigger information to the second electronic control unit. The trigger information includes a timing that triggers the second electronic unit to obtain the second sensor information from the second sensor. The second electronic control unit being configured to receive the trigger information, obtain, at the timing of the trigger information, the second sensor information from the second sensor, and send, to the first electronic control unit, the obtained second sensor information.

According to another aspect of the present invention, there is provided a distributed control system. The distributed control system includes a first electronic control unit connected to a first sensor and configured to obtain first sensor information therefrom for execution of allocated control. The distributed control system also includes a second electronic control unit connected to a second sensor and configured to obtain second sensor information therefrom for execution of allocated control. The distributed control system further includes a third electronic control unit for managing timings between the first and second electronic control units. The first, second and third electronic control units are communicably linked to each other. The third electronic control unit is configured to send trigger information to each of the first and second electronic control units. The trigger information includes a timing that triggers the first electronic unit to obtain the first sensor information from the first sensor and that triggers the second electronic unit to obtain the second sensor information from the second sensor. The first electronic control unit is configured to receive the trigger information, and obtain, at the timing of the trigger information, the first sensor information from the first sensor. The second electronic control unit is configured to receive the trigger information, and obtain, at the timing of the trigger information, the second sensor information from the second sensor.

BRIEF DESCRIPTION OF THE DRAWINGS

Other objects and aspects of the invention will become apparent from the following description of embodiments with reference to the accompanying drawings in which:

FIG. 2 is a flowchart schematically illustrating an AD trigger cycle setting task of an MPU of a first ECU illustrated in FIG. 1 according to the first embodiment;

FIG. 3 is a flowchart schematically illustrating a task of the MPU of the first ECU for setting a timing of sending a time synchronous message to a second ECU illustrated in FIG. 1 according to the first embodiment;

DETAILED DESCRIPTION OF EMBODIMENTS OF THE INVENTION

Figure 1:
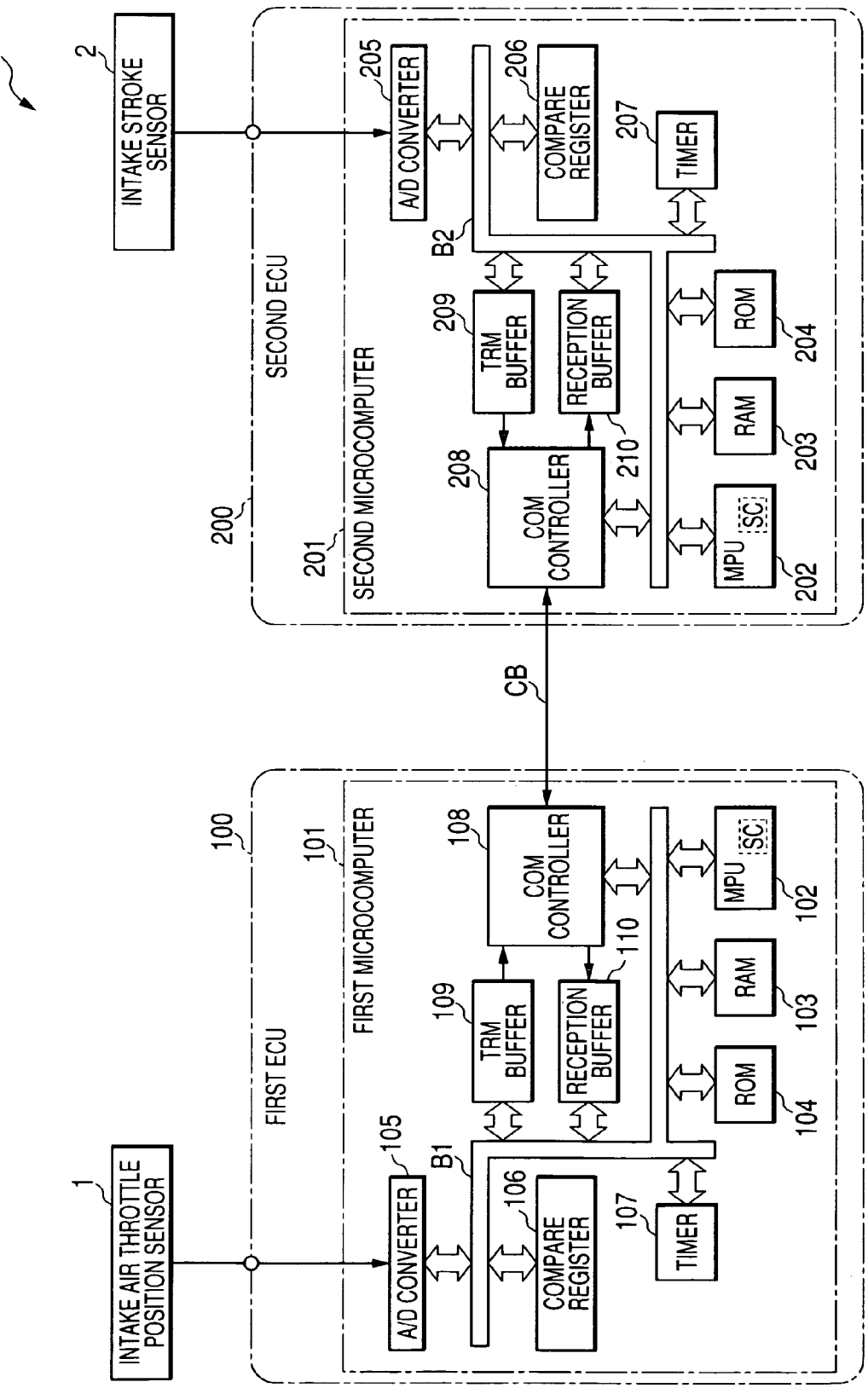
FIG. 1 is a block diagram schematically illustrating an example of the configuration of a vehicle control system according to a first embodiment of the present invention.

Embodiments of the present invention will be described hereinafter with reference to the accompanying drawings. In the drawings, like reference characters refer to like parts.

First Embodiment

In a first embodiment of the present invention, a distributed control system according to the present invention is applied to a vehicle control system that has been installed in a vehicle.

As illustrated in FIG. 1, the vehicle control system VC according to the first embodiment includes a first ECU (electronic control unit) 100 for execution of an allocated control of the vehicle, such as engine control, and a second ECU 200 for execution of allocated control of the vehicle, such as actuator-drive control. The first ECU 100 and the second ECU 200 are communicably linked to each other via a CAN bus CB.

The first ECU 100 is communicably connected to an intake throttle-position sensor 1 installed in the vehicle. The intake throttle-position sensor 1 is preferably configured to continuously monitor information representing throttle position of an intake throttle of the engine and to send, to the first ECU 100, the monitored throttle position information as analog sensor information in response to control of the first ECU 100. The analog sensor information measured by the intake throttle-position sensor 1 will be also referred to as first sensor information hereinafter.

The second ECU 200 is communicably connected to an intake stroke sensor 2 installed in the vehicle. The intake stroke sensor 2 is preferably configured to continuously monitor the stroke volume of an intake valve and to send, to the second ECU 200, the monitored stroke volume as analog sensor information in response to control of the second ECU 200. The analog sensor information measured by the intake stroke sensor 2 will be also referred to as second sensor information hereinafter.

In the first and second ECUs 100 and 200, first and second microcomputers 101 and 201 are installed, respectively.

The first microcomputer 101 is composed of an MPU (Microprocessor Unit) 102, a RAM (Random Access Memory, as an example of volatile memories) 103, a ROM (Read Only Memory, which is an example of non-volatile memories, such as a flash ROM) 104, and an analog-to-digital converter (A/D converter) 105.

The first microcomputer 101 is also composed of a compare register 106, a timer 107, a communications controller (COM controller) 108, a transmission buffer (TRM buffer) 109, a reception buffer 110, and an internal bus B1. All of the components 102 to 110 are connected to the internal bus B1 so that they are communicable with each other via the internal bus B1.

Similarly, the second microcomputer 201 is composed of an MPU 202, a RAM 203, a ROM 204, an A/D converter 205, a compare register 206, a timer 207, a communications controller 208, a transmission buffer 209, a reception buffer 210, and an internal bus B2. All of the components 202 to 210 are connected to the internal bus B2 so that they are communicable with each other via the internal bus B2.

Each of the components of the first microcomputer 101 will be described hereinafter.

The ROM 104 has stored therein various programs and/or initial data; these programs and initial data are required for the first microcomputer 101 (MPU 102) to control the engine of the vehicle.

The MPU 102 is the core of the first microcomputer 101. Specifically, the MPU 102 is configured to control the engine operation based on the programs and initial data stored in the ROM 104.

The RAM 103 is a volatile memory and serves as a working memory of the MPU 102. Specifically, the RAM 103 allows the MPU 102 to temporally store data therein halfway through tasks and/or data representing results of the tasks.

In response to a trigger command sent from the MPU 102 at an arbitrary timing, the A/D converter 105 is configured to be triggered to get the analog sensor information currently monitored by the intake throttle-position sensor 1 and to convert the analog sensor information into digital sensor data.

The timer 107 includes a counter and is configured to, for example, count up from its initial value, such as zero, of the counter upon the application of each clock pulse so as to measure passage of time based on control of the MPU 102.

The compare register 106 is configured to compare a compare value set by the MPU 102 with the count value of the timer 107 to generate an interruption when the count value coincides with the compare value.

The communications controller 108, the transmission buffer 109, and the reception buffer 110 are operative to communicate with the second ECU 200 via the CAN bus CB in a CAN communication protocol.

Specifically, the communications controller 108 is configured to send and receive messages to and from the second ECU 200 through the CAN bus CB. The transmission buffer 109 is configured to temporarily store therein a message to be sent from the first ECU 100 and the reception buffer 110 is configured to temporarily store a message received by the first ECU 100.

Specifically, the communications controller 108 is configured to read out the message stored in the transmission buffer 109 and to send it to the second ECU 200 in accordance with a communication cycle predetermined by the CAN communication protocol. The communications controller 108 is also configured to receive a message sent from the second ECU 200 and to write it into the reception buffer 110. Note that writing of a message into the transmission buffer 109 and readout of a message from the reception buffer 110 are executed by the MPU 102.

The microcomputer 201 has a structure substantially identical with that of the microcomputer 101 except for the A/D converter 205. Specifically, the MPU 202 triggers the A/D converter 205 at an arbitrary timing to get the analog sensor information currently monitored by the intake stroke sensor 2 and to convert the analog sensor information into digital sensor data.

In the vehicle control system VC set forth above, the first and second ECUs 100 and 200 are operative to distributedly handle their vehicle control tasks, respectively.

Specifically, the first ECU 100 is operative to perform various tasks associated with the engine including engine intake-air mass control task based on the first sensor information and second sensor information. The first ECU 100 is therefore operative to access the second ECU 200 via the CAN bus CB and to get the second sensor information from the second ECU 200.

As shown in the configuration of the vehicle control system VC, the intake throttle-position sensor 1 and the intake stroke sensor 2 are connected to the different first and second ECUs 100 and 200, respectively. Even through the first and second ECUs 100 and 200 can communicate with each other via the CAN bus CB, simply transmitting the second sensor information to the first ECU 100 from the second ECU 200 makes it difficult to ensure the synchronism between the first sensor information and second sensor information.

Thus, in the vehicle control system VC according to the first embodiment, the first ECU 100 is configured to send, to the second ECU 200, a time synchronous message indicative of a timing when getting the first sensor information as trigger information for getting the second sensor information. The second ECU 200 is configured to receive the time synchronous message and to get the second sensor information from the intake stroke sensor 2 in synchronization with the timing represented by the received time synchronous message, thereby sending the second sensor information to the first ECU 100.

Next, the tasks required to send and receive the second sensor information will be described hereinafter. Note that some of the tasks to be executed by the first ECU 100 in accordance with at least one program stored in, for example, the ROM 104 are illustrated in FIGS. 2 to 6, and 8. The remaining tasks to be executed by the second ECU 200 in accordance with at least one program stored in, for example, the ROM 204 are illustrated in FIGS. 9 to 12.

AD Trigger Cycle Setting Task

FIG. 2 schematically illustrates an AD trigger cycle setting task of the MPU 102 for setting intervals at which the first sensor information should be obtained and a desired number of pieces of first sensor information that are configured to be stored as a set of data. In the first embodiment, note that the MPU 102 of the first microcomputer 101 executes the AD trigger cycle setting task every time the first ECU 100 is initialized.

Referring to FIG. 2, in step S101, the MPU 102 activates the A/D converter 105 and sets an AD trigger cycle ADTrg- Time1 at which the A/D converter 105 should get the first sensor information from the intake throttle-position sensor 1. In the first embodiment, for example, the AD activation cycle ADTrgTime1 is set to 2 milliseconds (ms).

Next, in step S102, the MPU 102 sets a storage number ArraySize1 of pieces of first sensor information. In the first embodiment, for example, the storage number ArraySize1 is set to "4". Note that the storage number ArraySize1 of "4" represents that first to fourth pieces of first sensor information to which identifiers [0] to [3] are respectively assigned are configured to be stored as a set of data.

Subsequently, in step S103, the MPU 102 sets a time synchronous message send flag xIntMsgEnd1 to an off state, for example, to a logical low (logical 0). Note that the time synchronous message send flag xIntMsgEnd1 represents whether the time synchronous message has been sent to the second ECU 200. Specifically, when the time synchronous message send flag xIntMsgEnd1 is in an on state, the time synchronous message has already been sent to the second ECU 200, whereas when the time synchronous message send flag xIntMsgEnd1 is in the off state, the time synchronous message has not been sent to the second ECU 200 yet. In the first embodiment, in step S103, because the time synchronous message has not been sent to the second ECU 200 yet, the time synchronous message send flag xIntMsgEnd1 is set to the off state.

Sending Timing Setting Task

FIG. 3 schematically illustrates a task for setting a timing of sending the time synchronous message to the second ECU 200. In the first embodiment, note that the MPU 102 executes the sending timing setting task illustrated in FIG. 3 every predetermined communication cycle of the CAN protocol, for example, every intervals of 2 milliseconds.

Referring to FIG. 3, in step S201, the MPU 102 determines whether the time synchronous message send flag xIntMsgEnd1 is in an on state.

If it is determined that the time synchronous message send flag xIntMsgEnd1 is in the on state (the determination in step S201 is YES), since the time synchronous message send flag xIntMsgEnd1 has been already sent to the second ECU 200, the MPU 102 goes to step S205. In step S205, the MPU 102 requests the communications controller 108 to send a message being set to the transmission buffer 109.

Otherwise if it is determined that the time synchronous message send flag xIntMsgEnd1 is in the off state (the determination in step S201 is NO), since the time synchronous message send flag xIntMsgEnd1 has not been sent to the second ECU 200 yet, the MPU 102 goes to step S202. In step S202, the MPU 102 sets, to the transmission buffer 109, a request to send the time synchronous message; this request is, for example, a flag with a logical high (logical 1). The request will also be referred to as request flag hereinafter.

Subsequently, in step S203, the MPU 102 writes the AD trigger cycle ADTrgTime1 into the transmission buffer 109, and in step S204, the storage number ArraySize1 thereinto; these AD trigger cycle ADTrgTime1 and the storage number ArraySize1 constitute the time synchronous message.

Next, in step S205, the MPU 102 requests the communications controller 108 to send a message being set to the transmission buffer 109. Specifically, because the request flag is set to logical 1 in step S202, the communications controller 108 sends, to the second ECU 200 via the CAN bus CB, the time synchronous message consisting of the AD trigger cycle ADTrgTime1 and the storage number Array-Size1. This allows the second ECU 200 to set the AD trigger cycle ADTrgTime1 and the storage number ArraySize1 of the first ECU 100 as its AD trigger cycle and its storage number, respectively. Note that the AD trigger cycle of the second ECU 200 represents a cycle at which the A/D converter 205 should get the second sensor information from the intake stroke sensor 2, and the storage number represents pieces of second sensor information that are configured to be stored as a set of data.

After completion of sending the time synchronous message to the second ECU 200, the MPU 102 cancels the request flag in step S202, in other words, sets the request flag to logical low (logical zero) in step S205.

Interruption Handling After Completion of Time Synchronous Message Sending

Figure 4:
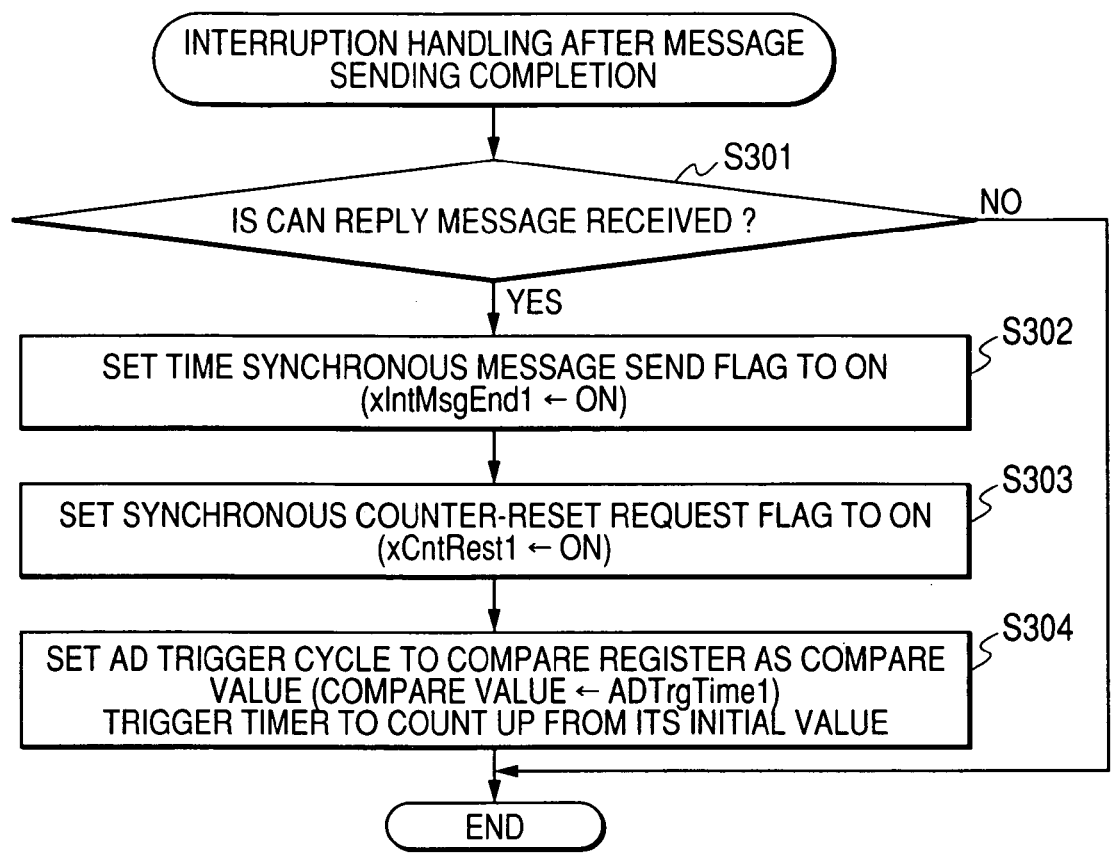
FIG. 4 is a flowchart schematically illustrating an interruption handling routine to be executed by the MPU of the first ECU after completion of sending the time synchronous message to the second ECU according to the first embodiment.

FIG. 4 schematically illustrates an interruption handling routine to be executed by the MPU 102 after completion of sending the time synchronous message to the second ECU 200.

Referring to FIG. 4, in step S301, the MPU 102 determines whether a CAN reply message is sent from the second ECU 200 to the first ECU 100. Note that the CAN reply message means a message to be sent from the second ECU 200 as a reply when a message is received thereby via the CAN bus CB.

If it is determined that no reply messages are sent to the first ECU 100 (the determination in step S301 is NO), the MPU 102 exits the interruption handling routine.

Otherwise if it is determined that the CAN reply message is sent to the first ECU 100 (the determination in step S301 is YES), the MPU 102 determines that the second ECU 200 securely has received the time synchronous message. Then, in step S302, the MPU 102 sets the time synchronous message send flag xIntMsgEnd1 to an on state, such as a logical high (logical 1).

Next, in step S303, the MPU 102 sets a synchronous counter-reset request flag xCntRest1 to the on state (logical high). Note that the synchronous counter-reset request flag xCntRest1 allows the count value of a synchronous counter of the MPU 102, which will be described hereinafter, to be reset to its initial value of, for example, zero (0).

In step S304, in response to the receipt timing of the CAN reply message, the MPU 102 sets the AD trigger cycle ADTrgTime1 to the compare register 106 as the compare value and triggers the timer 107 to count up from its initial value (e.g. 0). This allows the compare register 106 to generate an interruption every time the AD trigger cycle ADTrgTime1 has elapsed.

Compare Interruption Task

Figure 5:
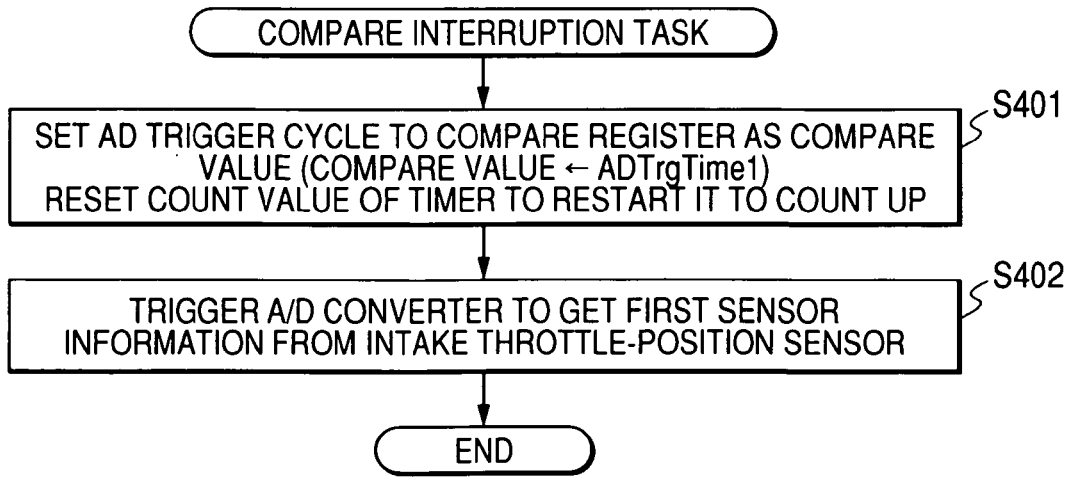
FIG. 5 is a flowchart schematically illustrating a compare interruption task to be executed by the MPU of the first ECU when an interruption is generated by a compare register of the first ECU according to the first embodiment.

FIG. 5 schematically illustrates a compare interruption task to be executed by the MPU 102 when an interruption is generated by the compare register 106. This compare interruption task allows the first sensor information to be obtained from the intake throttle-position sensor 1 every AD trigger cycle ADTrgTime1.

Referring to FIG. 5, in step S401, the MPU 102 sets the AD trigger cycle ADTrgTime1 to the compare register 106 as the compare value for the next interruption, and resets the count value of the timer 107 to its initial value (zero), thereby restarting the timer 107 to count up from its initial value.

Subsequently, in step S402, the MPU 102 triggers the A/D converter 105 to acquire a piece of the first sensor information, that is, a piece of digital sensor data corresponding thereto, from the first intake throttle-position sensor 1.

Sensor Information Storing Task on Completion of Compare Interruption Task

Figure 6:
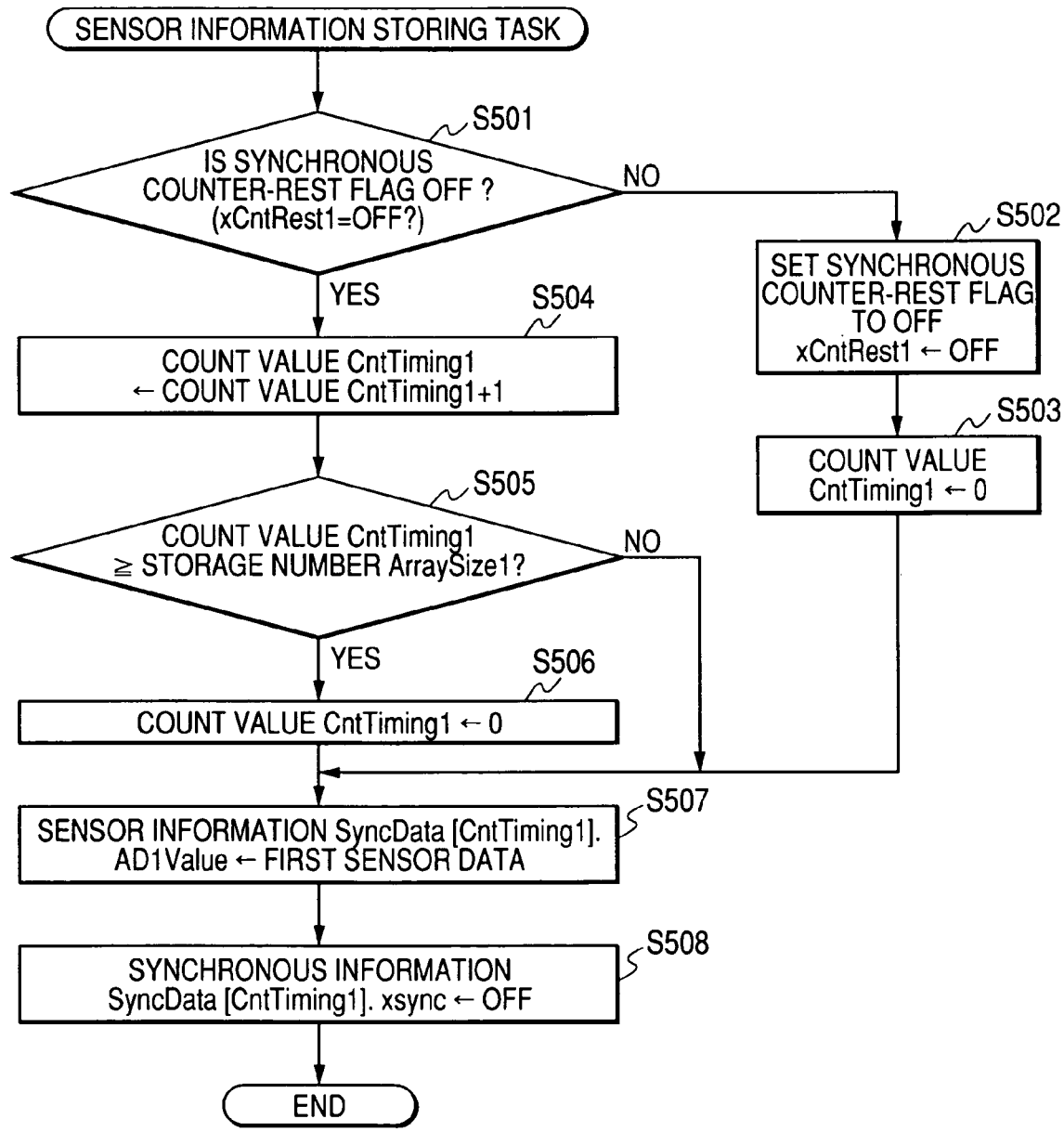
FIG. 6 is a flowchart schematically illustrating a sensor-information storing task to be executed by the MPU of the first ECU on completion of a compare interruption task according to the first embodiment.

FIG. 6 schematically illustrates a sensor-information storing task to be executed by the MPU 102 on completion of the compare interruption task. This sensor-information storing task allows pieces of the first sensor information obtained by the A/D converter 105 in step S402 of the compare interruption task to be stored in the RAM 103.

As illustrated in FIG. 6, in step S501, the MPU 102 determines whether the synchronous counter-reset request flag xCntRest1 is in an off state. If it is determined that the synchronous counter-reset request flag xCntRest1 is in an on state (the determination in step S501 is NO), the MPU 102 sets the synchronous counter-reset request flag xCntRest1 to the off state in step S502.

Thereafter, the MPU 102 resets a count value CntTiming1 of its synchronous counter SC to its initial value of, for example, zero (0). Note that the count value CntTiming1 of the synchronous counter SC of the MPU 102 represents a timing at which each piece of the first sensor information is obtained from the intake throttle-position sensor 1, which is used to indicator of each piece of the second sensor information to be obtained by the second ECU 200. Note that as the synchronous counter SC one of internal counters of the MPU 102 is used in the first embodiment, but an external counter can be used.

After step S503, the MPU 102 stores a piece of the first sensor information obtained in step S402 in the RAM 103 in step S507.

Note that, in the first embodiment, in view of convenience in use of the sensor information, the MPU 102 is configured to store a set of the first sensor information of the intake throttle-position sensor 1, the second sensor information of the intake stroke sensor 2, and synchronous information (the count value of the synchronous counter SC) in the RAM 103 as structure data SyncData.

Specifically, the structure data SyncData is composed of first members [AD1Value] corresponding to pieces of the first sensor information, and second members [AD2Value] corresponding to pieces of the second sensor information. In addition, the structure data SyncData is composed of third members [xsync] corresponding to count values of the synchronous counter SC indicative of synchronous state between the pieces of the first sensor information and those of the second sensor information.

Each of the third members [xsync] represents synchronous state between one of the first members [AD1Value] and corresponding one of the second members [AD2Value].

In addition, note that the structure data SyncData has an array of each of the first to third members. Specifically, in step S402, the MPU 102 obtains a piece of the first sensor information every AD trigger cycle ADTrgTime1 and stores the obtained piece of the first sensor information in the RAM 103 as an element of an array every AD trigger cycle ADTrgTime1.

Noyte that the size of an array for each of the first to third members is set as the storage number ArraySize1 in step S102. Specifically, in the first embodiment, the size of each array consists of first to fourth pieces [0] to [3] of each member. As the size of each array, another size can be applied in view of convenience in use of the sensor information.

As set forth above, in step S507, the MPU 102 stores a piece of the first sensor information (digital sensor data) obtained in step S402 in the RAM 103 as a piece of the first sensor data SyncData[CntTiming1].AD1 Value, which is one of the first members of the array in the structure data Syncdata. Note that the [CntTiming1] is a variable taking any one of 0, 1, 2, and 3 total number of which corresponds to the storage number of "4".

Subsequently, in step S508, the MPU 102 stores a piece of the synchronous information SyncData[CntTiming1].xsync in the RAM 103, which is associated with the stored piece of the first sensor data, as an off state. This is because it is not known whether the synchronism of the piece of the first sensor information with respect to the second sensor information is ensured. The piece of the synchronous information SyncData[CntTiming1].xsync is one of the third elements of the array in the structure data Syncdata.

Note that the count value CntTiming1 of the synchronous counter SC at that time is zero so that the piece of the first sensor data is represented as SyncData[0].AD1Value, and the synchronous information is represented as SyncData[0].xsync because it is reset in step S503.

Otherwise if it is determined that the synchronous counter-reset request flag xCntRest1 is in the off state (the determination in step S501 is YES), the MPU 102 increments the count value CntTiming1 of the synchronous counter SC by 1 in step S504. Next, in step S505, the MPU 102 determines whether the count value CntTiming1 of the synchronous counter SC is not less than the storage number ArraySize1, that is, "4".

If it is determined that the count value of the synchronous counter SC is less than the storage number ArraySize1 (the determination in step S505 is NO), the MPU 102 stores a piece of the first sensor information (digital sensor data) obtained in step S402 in the RAM 103 as a piece of the first sensor data SyncData[CntTiming1].AD1Value in step S507, which is one of the first members of the array in the structure data Syncdata.

Subsequently, in step S508, the MPU 102 stores, as a piece of the synchronous information SyncData[CntTiming1].xsync in the RAM 103, which is associated with the stored piece of the first sensor data, the off state in addition to the count value CntTiming1 of the synchronous counter SC upon obtaining of the piece of the first sensor data in step S402. This is because it is not known whether the synchronism of the piece of the first sensor information with respect to the second sensor information is ensured. The piece of the synchronous information SyncData[CntTiming1].xsync is one of the third members of the array in the structure data Syncdata.

Note that the count value CntTiming1 of the synchronous counter SC at that time is a value incremented in step S504, that is, any one of the values "1" to "3".

In step S505, if it is determined that the count value CntTiming1 of the synchronous counter SC is not less than the storage number ArraySize1 (the determination in step S505 is YES), that is, "4", the MPU 102 resets the count value CntTiming1 of the synchronous counter SC to zero. Next, in step S507, the MPU 102 stores a piece of the first sensor information (digital sensor data) obtained in step S402 in the RAM 103 as a piece of the first sensor data SyncData[CntTiming1].AD1Value, which is one of the first members of the array in the structure data Syncdata.

Subsequently, in step S508, the MPU 102 stores, as a piece of the synchronous information SyncData[CntTiming1].xsync in the RAM 103, which is associated with the stored piece of the first sensor data, the off state in addition to the count value CntTiming1 of the synchronous counter SC upon obtaining of the piece of the first sensor data in step S402. The piece of the synchronous information SyncData [CntTiming1].xsync is one of the third members of the array in the structure data Syncdata. Note that the count value CntTiming1 of the synchronous counter SC at that time is zero because it is reset in step S506.

Figure 7A:
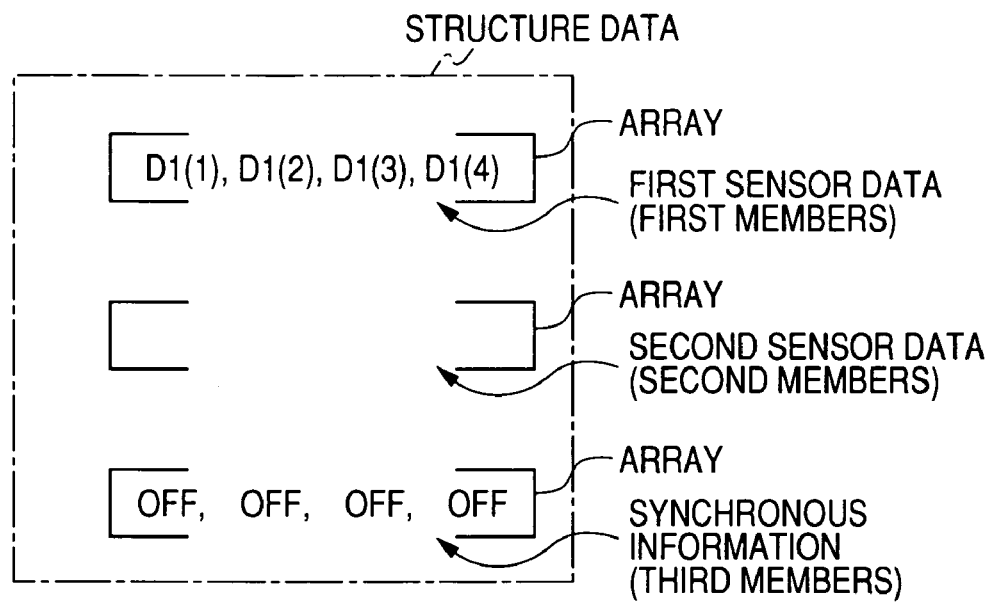
FIG. 7A is a view schematically illustrating an example of structure data after completion of the sensor-information storing task according to the first embodiment.

As a result, as illustrated in FIG. 7A, in the RAM 103, four pieces of the first sensor data (four first members; D1(1) to D1(4) in FIG. 7A), which corresponds to the storage number ArraySize1 of "4", have been stored as the array in the structure data Syncdata. In addition, four pieces of the synchronous information (four third members with the off states, respectively) have been stored as the array in the structure data, which are associated with the four pieces of the first sensor data, respectively.

Can Receiving Task

Figure 8:
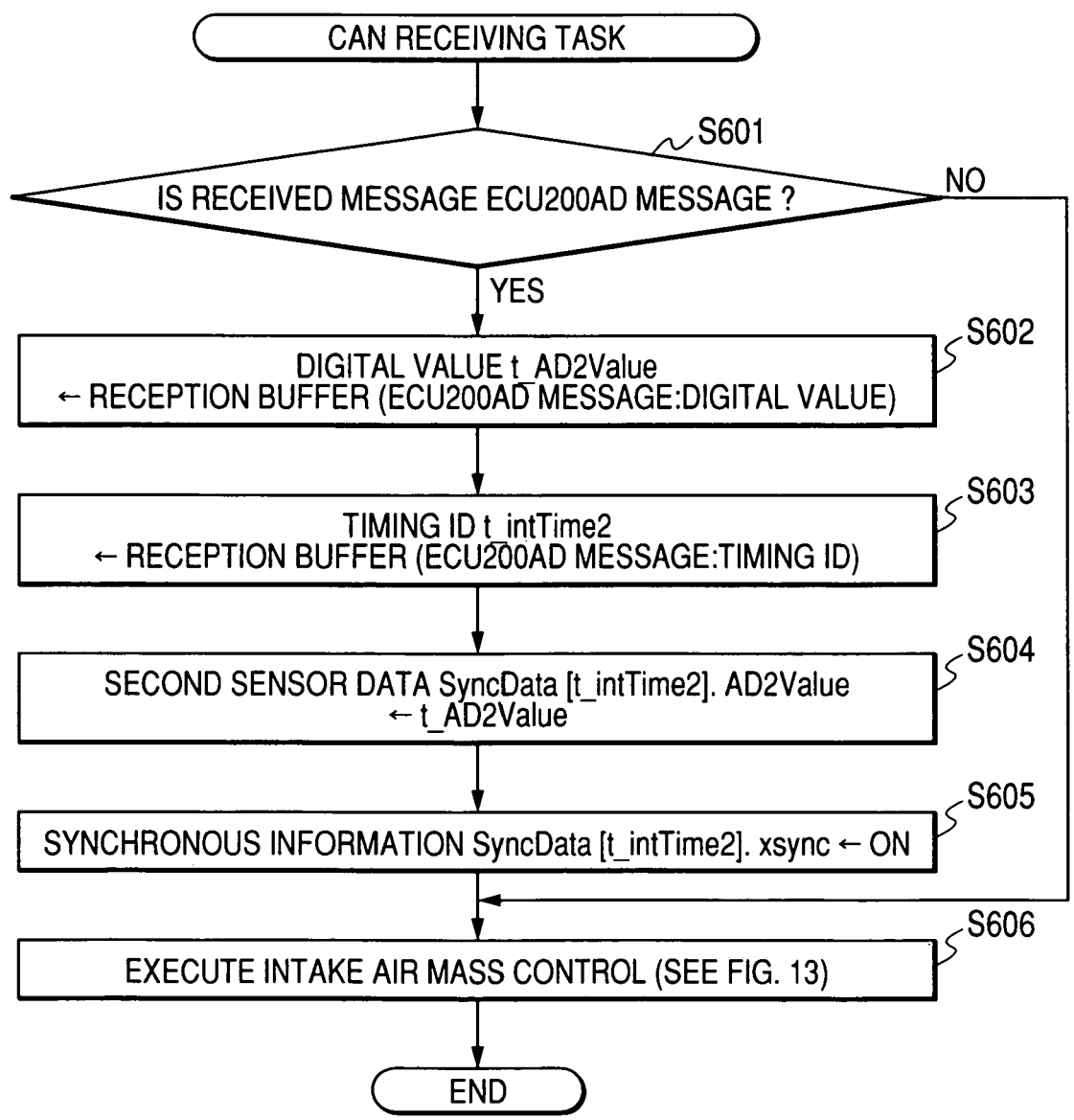
FIG. 8 is a flowchart schematically illustrating a CAN receiving task to be executed by the MPU of the first ECU upon receipt of a message sent via a CAN bus CB from the second ECU in the CAN protocol according to the first embodiment.

FIG. 8 schematically illustrates a CAN receiving task to be executed by the MPU 102 upon receipt of a message sent via the CAN bus CB from the second ECU 200 in the CAN protocol. This CAN receiving task allows the second sensor information sent from the second ECU 200 to be stored in the RAM 103.

As illustrated in FIG. 8, in step S601, the MPU 102 determines whether the received message sent from the second ECU 200 is an ECU200AD message containing the second sensor information of the intake stroke sensor 2 and the like.

If it is determined that the received message sent from the second ECU 200 is not the ECU200AD message (the determination in step S601 is NO), the MPU 102 executes intake air mass control described hereinafter in step S606 (see FIG. 13 hereinafter).

Otherwise if it is determined that the received message sent from the second ECU 200 is the ECU200AD message (the determination in step S601 is YES), the MPU 102 recognizes that the ECU200AD message has been stored in the reception buffer 110 by the communications controller 108.

Thus, in step S602, the MPU 102 reads out a piece of the second sensor information (a piece of second digital data) contained in the ECU200AD message as a digital value t_AD2Value.

Next, in step S603, the MPU 102 reads out a timing ID (identifier) contained in the ECU200AD message as a timing ID t_intTime2; this timing ID temporally identifies the timing at which the piece of the second sensor information t_AD2Value was obtained.

Subsequently, in step S604, the MPU 102 stores the digital value t_AD2Value read out in step S602 in the RAM 103 as a piece of the second sensor data SyncData[t_int-Time2].AD2Value consisting of the digital value t_AD2Value associated with the timing ID [t_intTime2] corresponding thereto. Specifically, the piece of the second sensor data SyncData[t_intTIme2].AD2Value is one of the second members of the array in the structure data Syncdata.

Note that the timing ID [t_intTime2] is a variable taking any one of 0, 1, 2, and 3 total number of which corresponds to the storage number of "4".

Specifically, in step S604, the MPU 102 recognizes any one of the pieces of the first sensor data (first members) whose variable [CntTiming1] coincides with the timing ID [t_intTime2]. Next, the MPU 102 stores the piece of the second sensor data SyncData[t_intTIme2].AD2Value as one of the second members of the array in the structure data Syncdata to be associated with the recognized one of the pieces of the first sensor data (first members) (see FIG. 7B).

Figure 7B:
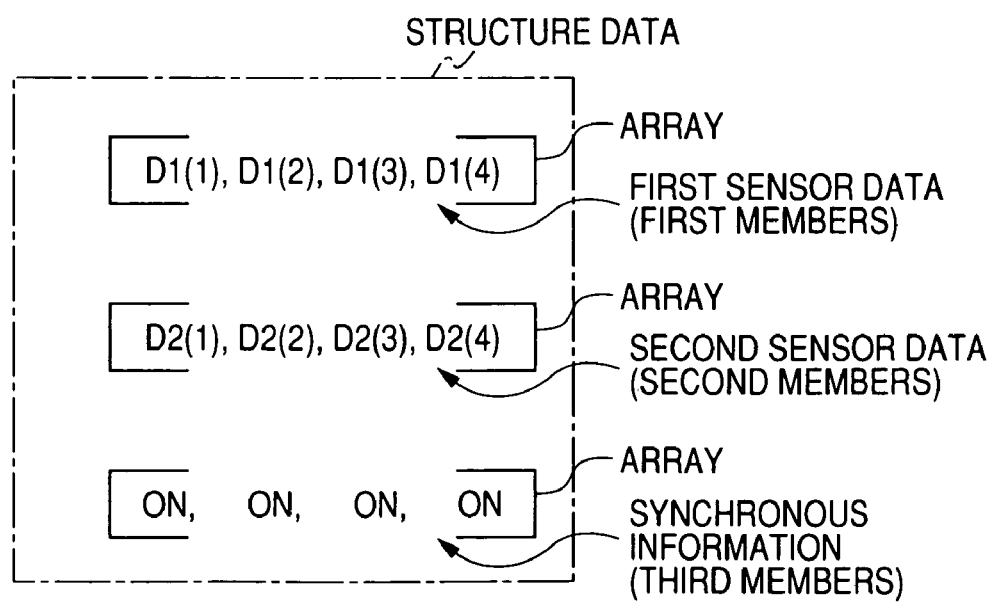
FIG. 7B is a view schematically illustrating an example of the structure data after completion of a CAN receiving task according to the first embodiment.

Next, in step S605, the MPU 102 turns a piece of the synchronous information SyncData[CntTiming2].xsync, which is one of the third members of the array in the structure data Syncdata with the variable [CntTiming2] that coincides with the timing ID [t_intTime2], from the off state to an on state (see FIG. 7B).

Thereafter, in step S606, the MPU 102 executes the intake air mass control described hereinafter (see FIG. 13 hereinafter).

Next, the tasks to be executed by the second ECU 200 will be described hereinafter with reference to FIGS. 9 to 13.

Can Receiving Interruption Task

Figure 9:
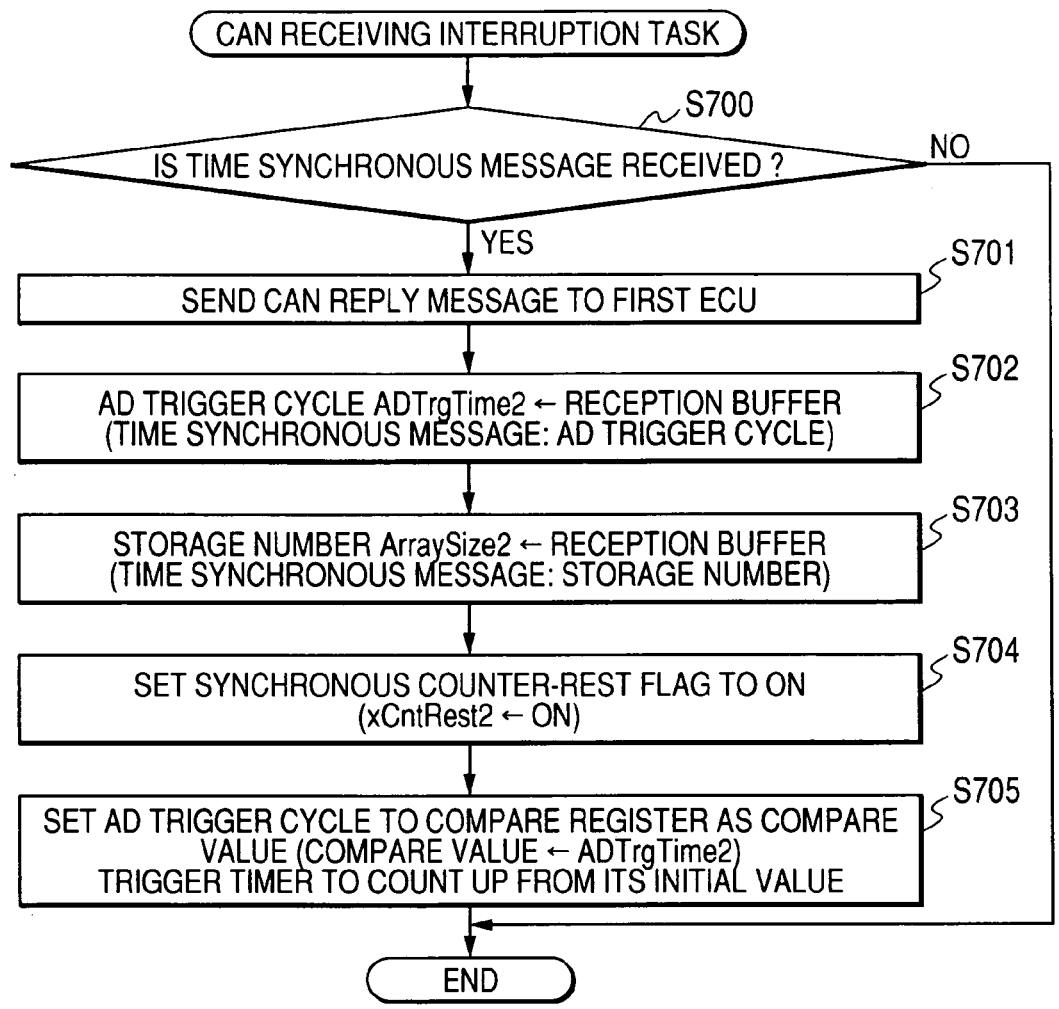
FIG. 9 is a view schematically illustrating a CAN receiving interruption task to be executed by an MPU of the second ECU upon reception of a message sent via the CAN bus from the first ECU in the CAN protocol according to the first embodiment.

FIG. 9 schematically illustrates a CAN receiving interruption task to be executed by an MPU 202 upon reception of a message sent via the CAN bus CB from the first ECU 100 in the CAN protocol.

Referring to FIG. 9, in step S700, the MPU 202 determines whether the received message sent from the first ECU 100 is the time synchronous message.

If it is determined that the received message sent from the first ECU 100 is not the time synchronous message (the determination in step S700 is NO), the MPU 202 exits the CAN receiving interruption task.

Otherwise if it is determined that the received message sent from the first ECU 100 is the time synchronous message (the determination in step S700 is YES), in step S701, the MPU 202 controls the communications controller 108 to send, to the first ECU 100, the CAN reply message indicative of the receipt of the time synchronous message. Subsequently, in step S702, the MPU 202 reads out the AD trigger cycle ADTrgTime1 contained in the time synchronous message stored in the reception buffer 210 to store it in the RAM 203 as an AD trigger cycle ADTrgTime2.

Next, in step S703, the MPU 202 reads out the storage number ArraySize1 contained in the time synchronous message to store it in the RAM 203 as a storage number ArraySize2.

Subsequently, in step S704, the MPU 202 sets a synchronous counter-reset request flag xCntRest2 to an on state (logical high). Note that the synchronous counter-reset request flag xCntRest2 allows the count value of a synchronous counter of the MPU 202, which will be described hereinafter, to be reset to its initial value of, for example, zero (0).

Next, in step S705, in response to the sending timing of the CAN replay message, the MPU 202 sets the AD trigger cycle ADTrgTime2 to the compare register 206 as the compare value, and triggers the timer 207 to count up from its initial value (e.g. 0). This allows the compare register 206 to generate an interruption every time the AD trigger cycle ADTrgTime2 has elapsed.

Compare Interruption Task

Figure 10:
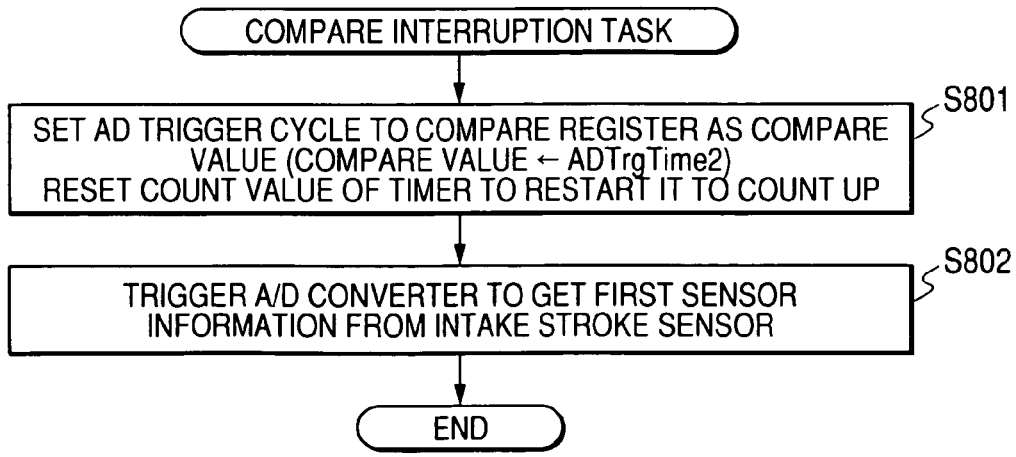
FIG. 10 is a flowchart schematically illustrating a compare interruption task to be executed by the MPU of the second ECU when an interruption is generated by a compare register of the second ECU according to the first embodiment.

FIG. 10 schematically illustrates a compare interruption task to be executed by the MPU 202 when an interruption is generated by the compare register 206. This compare interruption task allows the second sensor information to be obtained from the intake stroke sensor 2 every AD trigger cycle ADTrgTime2.

Referring to FIG. 10, in step S801, the MPU 202 sets the AD trigger cycle ADTrgTime2 to the compare register 206 as the compare value for the next interruption, and resets the count value of the timer 207 to its initial value (zero), thereby restarting the timer 207 to count up from its initial value.

Subsequently, in step S802, the MPU 202 triggers the A/D converter 205 to acquire a piece of the second sensor information, that is, a piece of digital sensor data corresponding thereto, from the second intake stroke sensor 2.

Sensor Information Storing Task on Completion of Compare Interruption Task

Figure 11:
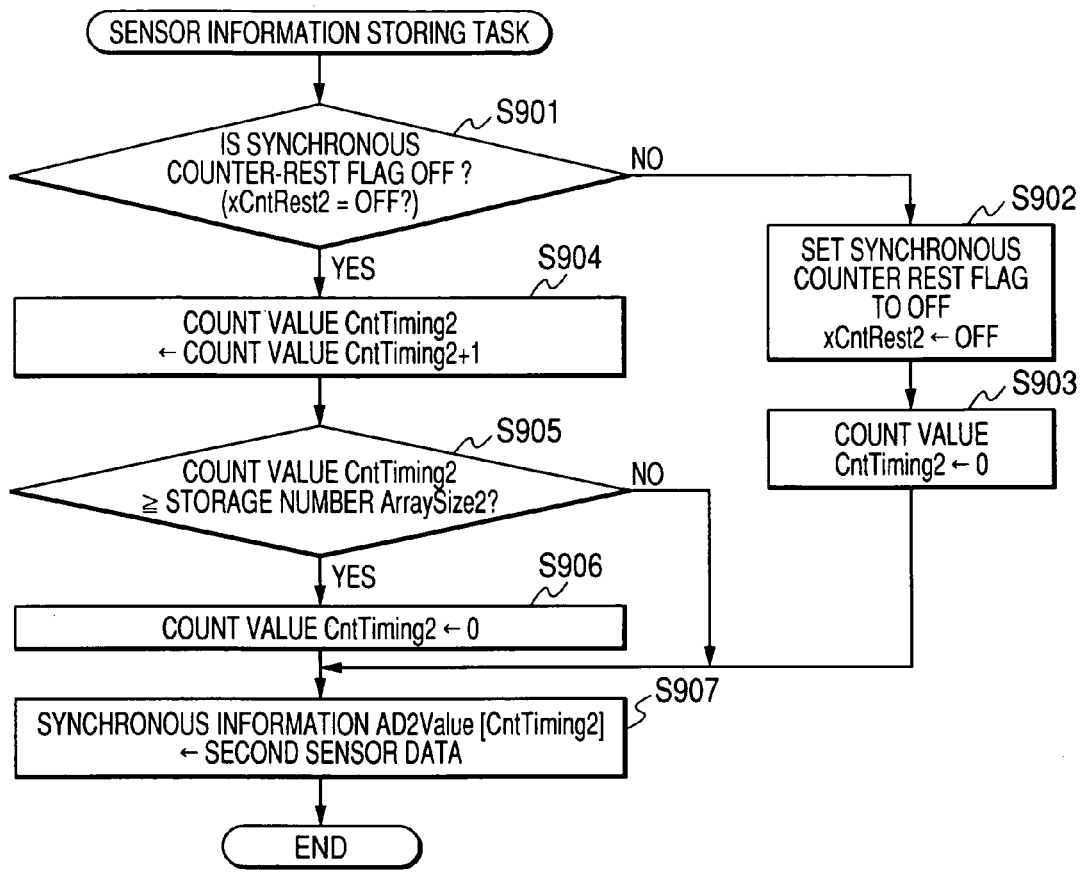
FIG. 11 is a flowchart schematically illustrating a sensor-information storing task to be executed by the MPU of the second ECU on completion of the compare interruption task according to the first embodiment.

FIG. 11 schematically illustrates a sensor-information storing task to be executed by the MPU 202 on completion of the compare interruption task. This sensor-information storing task allows pieces of the second sensor information obtained by the A/D converter 205 in step S802 of the compare interruption task to be stored in the RAM 203.

As illustrated in FIG. 11, in step S901, the MPU 202 determines whether the synchronous counter-reset request flag xCntRest2 is in an off state. If it is determined that the synchronous counter-reset request flag xCntRest2 is in an on state (the determination in step S901 is NO), the MPU 202 sets the synchronous counter-reset request flag xCntRest2 to the off state in step S902, and thereafter resets a count value CntTiming2 of its synchronous counter SC to its initial value of, for example, zero (0).

Note that the count value CntTiming2 of the synchronous counter SC of the MPU 202 represents a timing at which each piece of the second sensor information is obtained from the intake stroke sensor 2, which is used to indicator of each piece of the first sensor information to be obtained by the first ECU 100. Note that as the synchronous counter SC one of internal counters of the MPU 202 is used in the first embodiment, but an external counter can be used.

After step S903, the MPU 202 stores a piece of the second sensor information obtained in step S802 in the RAM 203 as a piece of the second sensor data AD2Value[CntTiming2] in step S907. Note that the [CntTiming2] is a variable taking any one of 0, 1, 2, and 3 total number of which corresponds to the storage number of "4".

Note that the count value CntTiming2 of the synchronous counter SC at that time is zero so that the piece of the second sensor data is represented as AD2Value[0] because it is reset in step S903.

Otherwise if it is determined that the synchronous counter-reset request flag xCntRest2 is in the off state (the determination in step S901 is YES), the MPU 202 increments the count value CntTiming2 of the synchronous counter SC by 1 in step S904. Next, in step S905, the MPU 202 determines whether the count value CntTiming2 of the synchronous counter SC is not less than the storage number ArraySize2, that is, "4".

If it is determined that the count value of the synchronous counter SC is less than the storage number ArraySize2 (the determination in step S905 is NO), the MPU 202 stores a piece of the second sensor information (digital sensor data) obtained in step S802 in the RAM 203 as the second sensor data AD2Value[CntTiming2] in step S907. Note that the count value CntTiming2 of the synchronous counter SC at that time is a value incremented in step S904, that is, any one of the values "1" to "3".

In step S905, if it is determined that the count value CntTiming2 of the synchronous counter SC is not less than the storage number ArraySize2 (the determination in step S905 is YES), that is, "4", the MPU 202 resets the count value CntTiming2 of the synchronous counter SC to zero. Next, in step S907, the MPU 202 stores a piece of the second sensor information (digital sensor data) obtained in step S802 in the RAM 203 as second sensor data AD2Value[CntTiming2]. Note that the count value CntTiming2 of the synchronous counter SC at that time is zero because it is reset in step S906.

Sending Timing Setting Task

Figure 12:
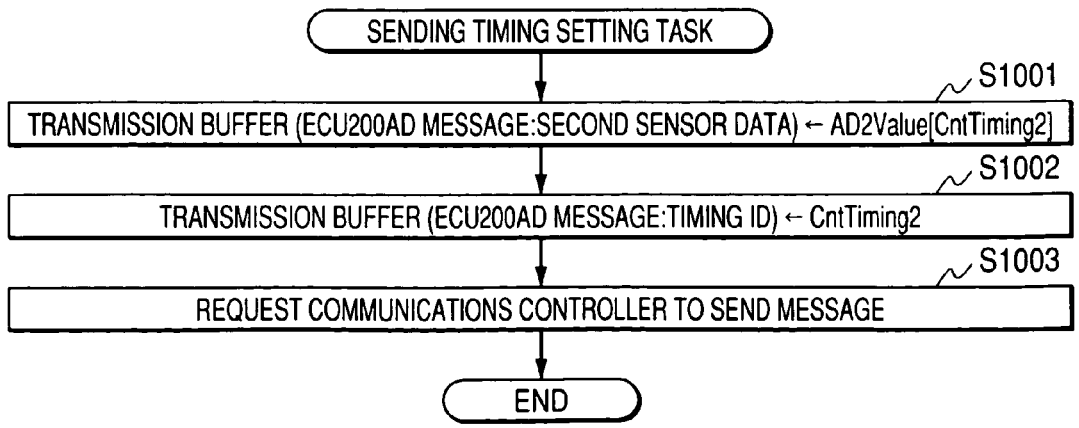
FIG. 12 is a flowchart schematically illustrating a task for setting a timing of sending an ECU200AD message containing a piece of second sensor information and a timing at which a piece of the second sensor information was obtained according to the first embodiment.

FIG. 12 schematically illustrates a task for setting a timing of sending the ECU200AD message containing a piece of the second sensor information and the timing at which the piece of the second sensor information was obtained. In the first embodiment, note that the MPU 202 executes the sending timing setting task illustrated in FIG. 12 every predetermined communication cycle of the CAN protocol, for example, every intervals of 2 milliseconds.

Referring to FIG. 12, in step S1001, the MPU 202 writes the piece of the second sensor data AD2Value[CntTiming2] obtained in step S907 into the transmission buffer 209 as the ECU200AD message.

Next, in step S1002, the MPU 202 writes the count value of the synchronous counter SC at which the piece of the second sensor data AD2Value[CntTiming2] was obtained into the transmission buffer 209 as a timing ID of the ECU200AD message.

Subsequently, in step S1003, the MPU 202 requests the communications controller 208 to send the ECU200AD message being set to the transmission buffer 209. As a result, the communications controller 208 sends, to the first ECU 100 via the CAN bus CB, the ECU200AD message.

Intake Air Mass Control

The intake air mass control task to be executed by the MPU 102 in step S606 of FIG. 8 will be described hereinafter with reference to FIG. 13.

Note that, as illustrated in FIG. 7B, the pieces of first sensor information obtained from the intake throttle-position sensor 1, those of the second sensor information obtained from the intake stroke sensor 2, and the pieces of the synchronous information have been stored to be associated with each other in the RAM 103 as the structure data SyncDate.

In addition, in the first embodiment, the MPU 102 is configured to, for example, read out any one of the pieces of the first sensor data and one of the pieces of the second sensor data, each of which corresponds to an arbitrary timing ADReqTiming corresponding to one of the pieces of the synchronous information, and to use the readout pieces of data when performing the intake air mass control.

Figure 13:
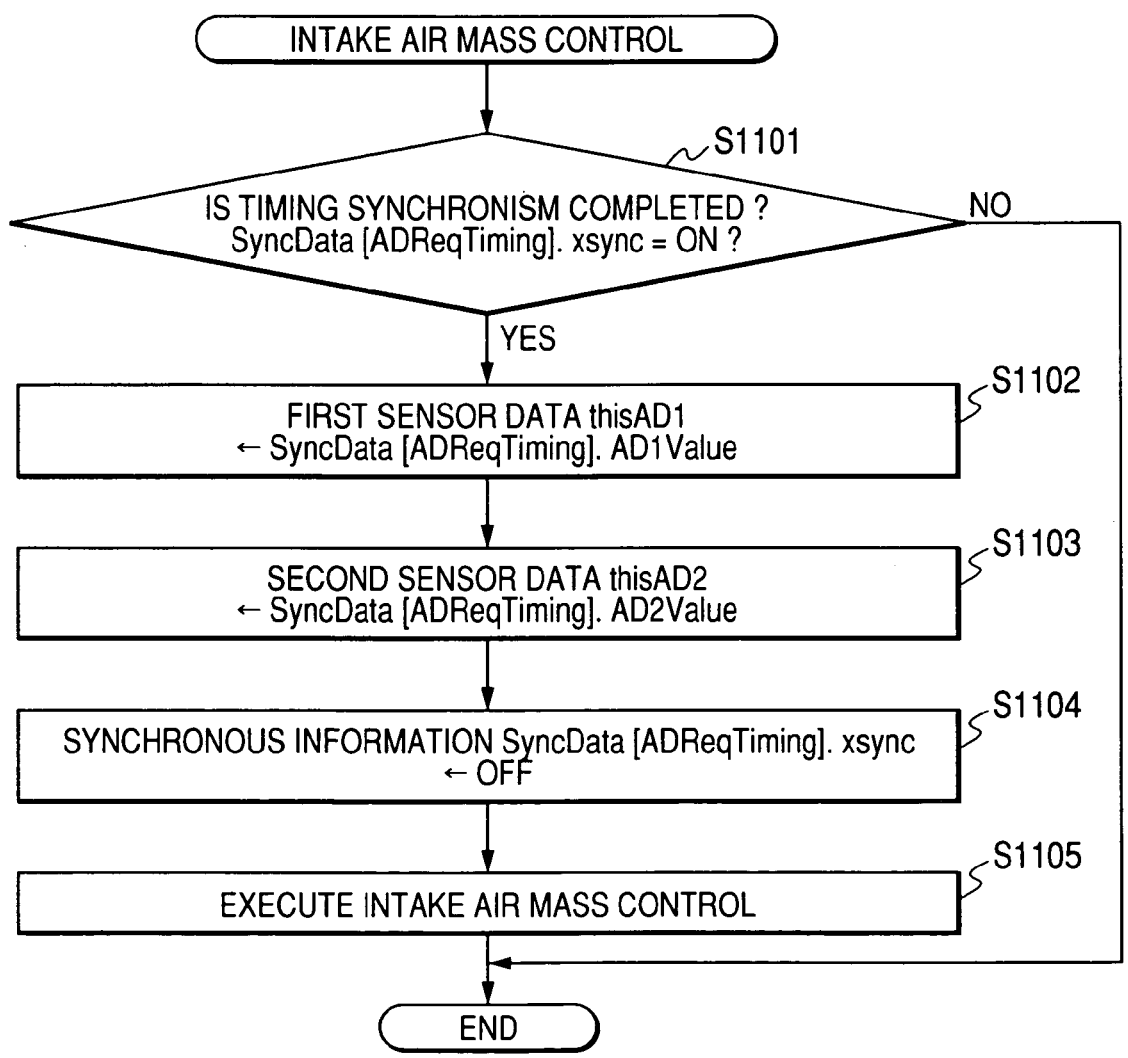
FIG. 13 is a flowchart schematically illustrating intake air mass control task to be executed by the MPU of the first ECU in step S606 of FIG. 8 according to the first embodiment.

As illustrated in FIG. 13, in step S1101, the MPU 102 determines whether one of the pieces of the synchronous data SyncData[ADReqTiming.xsync corresponding to the arbitrary timing ADReqTiming is in the on state. When performing the intake air mass control that requires the synchronism between the first sensor information to be measured by the intake throttle-position sensor 1 and the second sensor information to be measured by the intake stroke sensor 2, the MPU 102 allows for determination of whether the synchronism is established.

If it is determined that the one of the pieces of the synchronous data SyncData[ADReqTiming.xsync corresponding to the arbitrary timing ADReqTiming is in the off state (the determination in step S1101 is NO), it is determined that the synchronism is not ensured at the arbitrary timing ADReqTiming. Then, the MPU 102 keeps its current operation without performing the intake air mass control task.

Otherwise if it is determined that the one of the pieces of the synchronous data SyncData[ADReqTiming.xsync corresponding to the arbitrary timing ADReqTiming is in the on state (the determination in step S1101 is YES), in step S1102, the MPU 102 reads out one of the pieces of the first sensor data to be obtained at the arbitrary timing from the RAM 103. The one of the pieces of the first sensor data to be obtained at the arbitrary timing will be referred to as first sensor data SyncData[ADReqTiming].AD1Value.

In step S1102, the MPU 102 also stores in the RAM 103 the first sensor data SyncData[ADReqTiming].AD1Value as first sensor data thisAD1 that should be used for the intake air mass control.

Next, in step S1103, the MPU 102 reads out one of the pieces of the second sensor data to be obtained at the arbitrary timing from the RAM 103. The one of the pieces of the second sensor data to be obtained at the arbitrary timing will be referred to as second sensor data SyncData[ADReqTiming].AD2Value. The MPU 102 stores in the RAM 103 the second sensor data SyncData[ADReqTiming].AD2Value as second sensor data thisAD2 that should be used for the intake air mass control.

Subsequently, in step S1104, because the synchronism between the first sensor data SyncData[ADReqTiming].AD1 Value and the second sensor data SyncData[ADReqTiming].AD2Value, the MPU 102 sets the one of the pieces of the synchronous data SyncData[ADReqTiming.xsync to be the off state to prepare for the use thereof at the next timing. In step S1105, the MPU 102 executes the intake air mass control based on the first sensor data thisAD1 and the second sensor data thisAD2.

Next, the sequence of the tasks to be executed by the first and second ECUs 100 and 200 will be described hereinafter with reference to a timing chart illustrated in FIG. 14.

Figure 14:
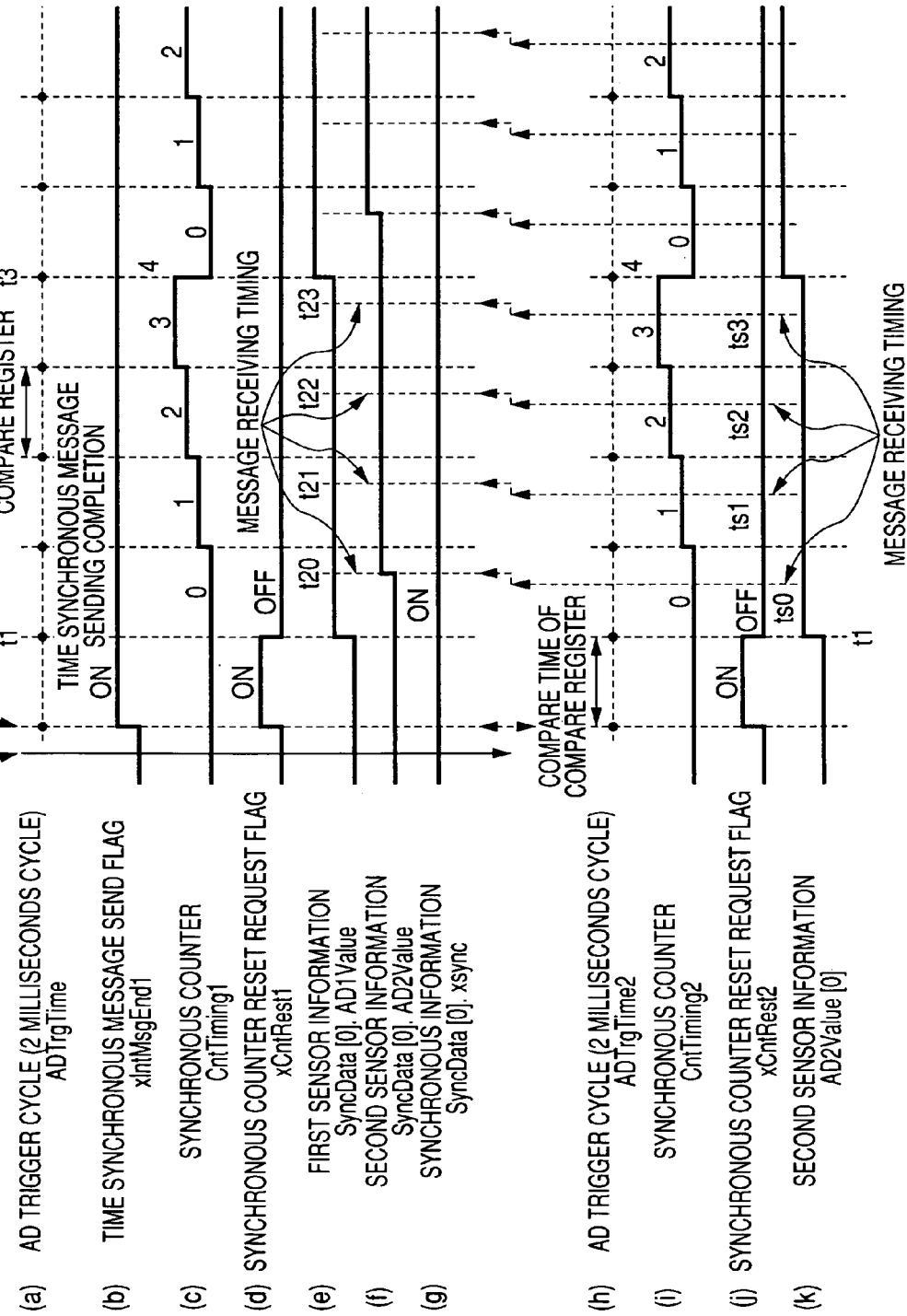
FIG. 14 is a timing chart schematically illustrating timings of the tasks of the first ECU's MPU or the second ECU's MPU illustrated in FIGS. 2 to 6 and 8 to 12.

As illustrated by (a) to (g) of FIG. 14, when the first ECU 100 is initialized, the time synchronous message is sent from the first ECU 100 to the second ECU 200 (see steps S201 to S205); this time synchronous message instructs the timing at which the second ECU 200 should take the second sensor information from the intake stroke sensor 2.

In contrast, from the second ECU 200, the CAN reply message indicative of the receipt of the time synchronous message is sent to the first ECU 100.

In the first ECU 100, upon receipt of the CAN reply message corresponding to an interruption timing of completion of sending the time synchronous message (see step S301 of FIG. 4), the time synchronous message send flag xIntMsgEnd1 is set to the on state (see (b) of FIG. 14 and step S302 of FIG. 4).

As illustrated by (d) of FIG. 14, in response to the receipt of the CAN reply message, the synchronous counter-reset request flag xCntRest1 is set to the on state so as to reset the count value CntTiming1 of the synchronous counter SC of the MPU 102 to zero (see step S303 of FIG. 4). Moreover, in response to the receipt of the CAN reply message, the compare value of the compare register 106 is set to the AD trigger cycle ADTrgTime1, and triggers the timer 107 to count up from its initial value (step S304 of FIG. 4).

This allows an interruption to be generated every time the AD trigger cycle ADTrgTime1 (e.g. 2 milliseconds) has elapsed (see (a) of FIG. 14 and step S304 of FIG. 4). In addition, the count value of the synchronous counter SC is reset to zero in response to turning-on of the synchronous counter-reset request flag xCntRest1 (see (c) of FIG. 14 and steps S502 and S503 in FIG. 6).

At the timing t1 after the AD trigger cycle ADTrgTime1 has elapsed since the timing of sending the CAN reply message indicative of the receipt of the time synchronous message, the AD trigger cycle ADTrgTime1 is set to the compare value of the compare register 106, and a piece of the first sensor information is obtained from the intake throttle-position sensor 1.

At the timing t1, as illustrated by (d) of FIG. 14, the synchronous counter-reset request flag xCntRest1 is set to the off state.

At that time, as illustrated by (c) and (e) of FIG. 14, the piece of first sensor data obtained when the count value CntTiming1 of the synchronous counter SC is zero is stored in the RAM 103 as data SyncData[0].AD1Value, which is one of the first members of the array in the structure data SyncData (see step S507 in FIG. 6).

On the other hand, in the second ECU 200, the AD trigger cycle ADTrgTime1 and the storage number ArraySize1 contained in the time synchronous message are stored in the RAM 203 as the AD trigger cycle ADTrgTime2 and the storage number ArraySize2 (see steps S702 and 703 of FIG. 9).

Subsequently, as illustrated by (j) of FIG. 14, in response to the CAN reply message sending timing synchronous with the interruption timing of completion of sending the time synchronous message, the synchronous counter-reset request flag xCntRest2 is set to the on state so as to reset the count value CntTiming2 of the synchronous counter SC of the MPU 202 to zero (see step S704 of FIG. 9). Moreover, the compare value of the compare register 206 is set to the AD trigger cycle ADTrgTime2, and the timer 207 is triggered to count up from its initial value (step S705 of FIG. 9).

This permits an interruption to be generated every time the AD trigger cycle ADTrgTime2 (e.g. 2 milliseconds) has elapsed (see (h) of FIG. 14 and step S705 of FIG. 9). In addition, the count value of the synchronous counter SC is reset to zero in response to turning-on of the synchronous counter-reset request flag xCntRest1 (see (i) of FIG. 14 and steps S902 and S903 in FIG. 11).

At the timing t1 after the AD trigger cycle ADTrgTime2 has elapsed since the timing at which the count value of the compare register 206 is set to zero, the AD trigger cycle ADTrgTime2 is set to the compare value of the compare register 206, and a piece of the second sensor information is obtained from the intake stroke sensor 2. At the timing t1, as illustrated by (j) of FIG. 14, the synchronous counter-reset request flag xCntRest2 is set to the off state.

At that time, as illustrated by (i) and (k) of FIG. 14, the piece of second sensor data obtained when the count value CntTiming2 of the synchronous counter SC is zero is stored in the RAM 203 as data AD2Value[O] (see step S907 in FIG. 11).

From the second ECU 200, the ECU200AD message containing the piece of the second sensor data AD2Value[0] is sent to the first ECU 100 in accordance with the CAN communication protocol at the timing (message sending timing) ts0 illustrated in FIG. 14 (see steps S1001 to S1003 of FIG. 12).

In the first ECU 100 receiving the ECU200AD message, at the timing (message receiving timing) t20 illustrated in FIG. 14, the piece of the second sensor data obtained from the intake stroke sensor 2, which is contained in the ECU200AD message, is read out therefrom (see step S602 of FIG. 8). As illustrated by (f) of FIG. 14, the readout piece of the second sensor data is stored in the RAM 103 as a piece of the second sensor data SyncData[0].AD2Value, which is one of the second members of the array in the structure data Syncdata (see step S604 of FIG. 8).

Because the timing ID (variable) [0] coincides with the variable [0] of the variable [0] of the piece of first sensor data SyncData[0].AD1Value, the piece of the synchronous information SyncData[0].xsync, which is one of the third members of the array in the structure data Syncdata with the variable [0] that coincides with the timing ID [0], is set from the off state to the on state (see (g) of FIG. 14 and step S605 of FIG. 8).

Thereafter, every time the interruption is generated in accordance with lapse of the AD trigger cycle ADTrgTime1 set to the count value of the compare register 106, setting of the AD trigger cycle ADTrgTime1 to the compare value of the compare register 106 and taking of a piece of the first sensor data are repeatedly performed. In response to each taking of a piece of the first sensor data, the count value of the synchronous counter SC of the MPU 102 is incremented by 1 (see (c) of FIG. 14 and step S504).

In the first ECU 100, each of the pieces of the first sensor data is stored in the RAM 103 as data SyncData[CntTiming1].AD1Value.

Similarly, in the second ECU 200, every time the interruption is generated in accordance with lapse of the AD trigger cycle ADTrgTime2 set to the count value of the compare register 206, setting of the AD trigger cycle ADTrgTime2 to the compare value of the compare register 206 and taking of a piece of the second sensor data are repeatedly performed. In response to each taking of a piece of the second sensor data, the count value of the synchronous counter SC of the MPU 202 is incremented by 1 (see (i) of FIG. 14 and step S904).

In the second ECU 200, each of the pieces of the second sensor data is stored in the RAM 203 as data AD2Value[CntTiming2]. The pieces of the second sensor data AD2Value[CntTiming2] are periodically sent to the first ECU 100 as the ECU200AD messages at the timings ts1, ts2, and ts3, respectively (see FIG. 14 and steps S1001 to S1003 of FIG. 12).

In the first ECU 100 receiving the ECU200AD message at each of the timings (message receiving timings) t21, t22, and t23 illustrated in FIG. 14, each of the pieces of the second sensor data AD2Value[CntTiming2] obtained from the intake stroke sensor 2, which is contained in the ECU200AD message, is read out therefrom (see step S602 of FIG. 8).

As illustrated by (f) of FIG. 14, the readout piece of the second sensor data is stored in the RAM 103 as a piece of the second sensor data SyncData[t_intTime2].AD2Value, which is one of the second members of the array in the structure data Syncdata (see step S604 of FIG. 8).

Because the timing ID (variable) [t_intTime2] coincides with the variable [CntTiming1] of at least one SyncData [CntTiming1].AD1 Value, the piece of the synchronous information SyncData[t_intTime2].xsync, which is one of the third members of the array in the structure data Syncdata with the variable [0] that coincides with the timing ID [0], is set from the off state to the on state (see (g) of FIG. 14 and step S605 of FIG. 8).

In addition, the piece of the synchronous information SyncData[t_Time2].xsync, which is one of the third members of the array in the structure data Syncdata and corresponds to the one of the second members of the array, are set from the off state to the on state (see (g) of FIG. 14 and step S605 of FIG. 8).

Then, synchronism between each of the pieces of the first sensor information SyncData[CntTIminga] and one of the pieces of the second sensor information SyncData[t_intTime2].AD2Value is determined based on the corresponding piece of the synchronous information SyncData[t_intTime2].xsync. Specifically, at least one pair of a piece of first sensor information and that of second sensor information, whose synchronism is established, can be supplied to the first ECU 100 to be used for the engine-intake air mass control.

Note that, in the first embodiment, the storage numbers ArraySize1 and ArraySize2 are set to the same value of "4". As illustrated by (c) and (i) of FIG. 14, this allows the count values CntTiming1 and CntTiming2 of the synchronous counters SC of the MPUs 102 and 202 to be reset to zero at the same timing t3 when the count values CntTiming1 and CntTiming2 reach "4".

Note that, in (e), (f), and (k) of FIG. 14, the piece of the first sensor information and that of the second sensor information are illustrated when each of the count values CntTiming1 and CntTiming2 of the synchronous counters SC of the MPUs 102 and 202 is set to zero for convenience of description. The pieces of the first sensor information and those of the second sensor information when the count values CntTiming1 and CntTiming2 of the synchronous counters SC of the MPUs 102 and 202 are set to "1", "2", and "3" are stored in the RAMs 103 and 203, respectively. Similarly, the pieces of the synchronous information when the count values CntTiming1 and CntTiming2 of the synchronous counters SC of the MPUs 102 and 202 are set to "1", "2", and "3" are set, respectively.

Moreover, in (e), (f), and (k) of FIG. 14, for convenience of description, in order to clearly show the separations of the pieces of each of the first sensor information and the second sensor information, the timings corresponding to the separations are stepwise-changed in the time axis; these separations correspond to the increments of the synchronous counters SC.

As described above, in the first embodiment, the vehicle control system VC can obtain the following effects:

(1) The first ECU 100 connected to the intake throttle-position sensor 1 is configured to generate the time synchronous message in synchronization with its timings to get pieces of the first sensor information from the intake throttle-position sensor 1, and to output the time synchronous message to the second ECU 200. This allows for synchronization of the timings of the second ECU 200 to get pieces of the second sensor information from the intake stroke sensor 2 with the timings to get the pieces of the first sensor information.

This makes it possible to ensure the synchronism between the pieces of the first sensor information and those of the second sensor information. The ensuring of synchronism between the pieces of the first sensor information and those of the second sensor information permits the first ECU 100 to perform the engine intake mass control based on the pieces of the first sensor information obtained by the first ECU 100 and those of the second sensor information sent from the second ECU 200 with high accuracy.

(2) The first ECU 100 is configured to send the AD trigger cycle ADTrgTime1 for instructing the cycle at which a piece of the first sensor information is obtained while it is contained in the time synchronous message to the second ECU 200. This allows the second ECU 200 to obtain a piece of the second sensor information at the AD trigger cycle ADTrgTime2 that is the same as the AD trigger cycle ADTrgTime1.

After sending of the time synchronous message to the second ECU 200, a piece of the second sensor information is sent from the second ECU 200 to the first ECU 100 at the same cycle. Specifically, it is unnecessary for the first ECU 100 to perform processes to periodically receive pieces of the second sensor information after sending the time synchronous message, making it possible to simplify the processes of the first ECU 100 to receive pieces of the second sensor information. In addition, in the first embodiment, the timing ID indicative of the time at which a piece of the second sensor information was obtained is sent to the first ECU 100 together with a piece of the second sensor information. This allows for easy handling of pieces of the second sensor information.

(3) The first ECU 100 is configured to send, to the second ECU 200, the storage number ArraySize1 representing a predetermined number of pieces of the second sensor information that the second ECU 200 should get while it is contained in the time synchronous message.

This allows the second ECU 200 to get a series of pieces of the second sensor information, whose number is equivalent to the storage number ArraySize1, from the intake stroke sensor 2, and to send, to the first ECU 100, the series of pieces of the second sensor information together with the timing IDs.

The timing IDs represent the timings at which the sequential pieces of the second sensor information are obtained from the intake stroke sensor 2. This allows the first ECU 100 to store therein a desired number of pieces of the second sensor information, which corresponds to a desired time range and are set in accordance with the intended use during engine control, such as engine intake air mass control. This makes it possible to expand the versatility of the vehicle control system VC. The first ECU 100 can store therein a series of historical pieces of each of the fist sensor information and the second sensor information; this number of the historical pieces corresponds to the storage number ArraySize1.

This allows the first ECU 100 to grasp change of the pieces of each of the fist sensor information and the second sensor information over time, which can contribute to the improvement of reliability of the first sensor information and second sensor information and/or control tasks to be executed by the first ECU 100.

(4) The first ECU 100 and the second ECU 200 are communicably linked to each other via the CAN bus CB such that various items of information including the time synchronous messages and the like are communicated therebetween as CAN messages in accordance with the CAN communication protocol.

This allows the vehicle control system VC to be easily applicable for a conventional vehicle control system using the CAN. Specifically, the vehicle control system VC according to the first embodiment allows high degree of freedom for change in a conventional vehicle control system to be ensured.

(5) Even if the vehicle control system VC is configured such that the intake throttle-position sensor 1 is connected to the first ECU 100, and the intake stroke sensor 2 is connected to the second ECU 200, it is possible to ensure the synchronism between the first sensor information obtained from the sensor 1 and the second sensor information obtained from the sensor 2 by communicating the time synchronous message therebetween. This allows for realization of intake air mass control with high accuracy.

Note that the vehicle control system VC according to the first embodiment can be modified, for example, as follows:

Specifically, the first ECU 100 can periodically send the time synchronous message after sending the time synchronous message when the first ECU 100 was initialized, or can periodically sent the synchronous message desired timings except for the initializing timing. This modification allows for periodical correction of the gaps between the timings at which pieces of the first sensor information were obtained and the corresponding timings at which pieces of the second sensor information were obtained.

This makes it possible to further improve the reliability of the synchronism of the first sensor information and the second sensor information. In contrast, as another modification, the first ECU 100 can non-periodically send the time synchronous message. This allows the first ECU 100 to send the time synchronous message only if the synchronism between the first sensor-information and the second sensor information is required in the conduct of engine control. This makes it possible to reduce the load of the first ECU 100.

In the first embodiment, a series of four pieces of the first sensor information, which correspond to the storage number ArraySize1 of "4", is stored in the first ECU 100, and a series of four pieces of the second sensor information, which correspond to the storage number ArraySize1 of "4", is stored in the second ECU 200. The storage number ArraySize1 can be set to a desired number corresponding to a desired time range accordingly. For example, even if the storage number ArraySize1 is set to "1", it is possible to achieve a basic object for ensuring the synchronism between the first sensor information and the second sensor information.

In the first embodiment, the timing ID at which a piece of the second sensor information is obtained is sent from the second ECU 200 together with the second sensor information. In the present invention, however, if the first ECU 100 can recognize the synchronism between each piece of the first sensor information and each piece of the second sensor information without using the timing ID, the sending of the timing ID from the second ECU 200 can be omitted.

Second Embodiment

In a second embodiment of the present invention, a distributed control system according to the present invention is applied to a vehicle control system that has been installed in a vehicle. Note that like reference characters are assigned to like parts in the vehicle control systems according to the first and second embodiments so that descriptions of the parts will be omitted.

Figure 15:
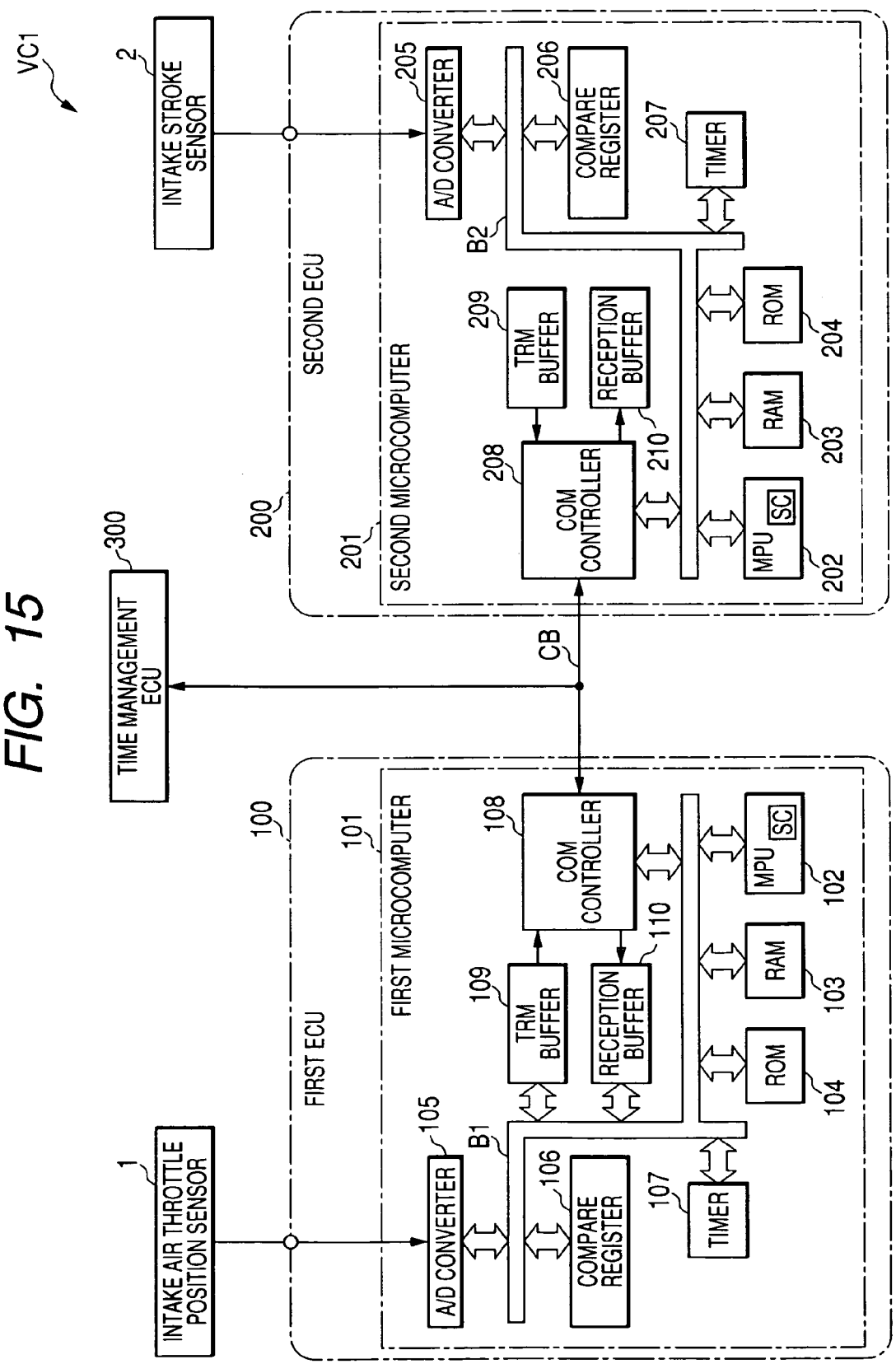
FIG. 15 is a block diagram schematically illustrating an example of the configuration of a vehicle control system according to a second embodiment of the present invention.

As illustrated in FIG. 15, the vehicle control system VC1 according to the second embodiment includes a time management ECU 300 in addition to the first ECU 100 and the second ECU 200. The first ECU 100, the second ECU 200, and the time management ECU 300 are communicably linked to each other via the CAN bus CB.

The time management ECU 300 has substantially the same configuration as that of the first ECU 100 or the second ECU 200. Specifically, the time management ECU 300 includes a microcomputer, and the microcomputer is composed of an MPU, a RAM, a ROM, a transmission buffer, a reception buffer, and the like, all of the elements are communicable with each other via an internal bus.

Note that, as the time management ECU, a new ECU can be installed in the vehicle, or another ECU that is operative to distributedly execute another control task associated with the vehicle can also be used.

In the vehicle control system VC1 according to the second embodiment, the time management ECU 300 is configured to mainly send, to the second ECU 200, the time synchronous message in place of the first ECU 100. This makes it unnecessary for the first ECU 100 to execute the task required to send the time synchronous message, and mainly to trigger the A/D converter 105 to get pieces of the first sensor information in accordance with the AD trigger cycle contained in the time synchronous message to be sent from the time management ECU 300.

Moreover, the configuration of the vehicle control system VC 1 allows the tasks to be executed by the second ECU 200 to be maintained independently of the change of the configuration of the vehicle control system VC. This is because, regarding the second ECU 200, the source of sending the time synchronous message is just merely changed from the first ECU 100 to the time management ECU 300. The tasks to be executed by the second ECU 200 according to the second embodiment are therefore substantially identical with those of the second ECU 200 according to the first embodiment.

Next, the tasks to be executed by the vehicle control system VC1 will be described hereinafter.

Specifically, the time management ECU 300 executes the AD trigger cycle setting task illustrated in FIG. 2 and the sending timing setting task illustrated in FIG. 3 so as to send the time synchronous message to each of the first and second ECUs 100 and 200. This allows for sending, to both the first and second ECUs 100 and 200, of the time synchronous message including the AD trigger cycle ADTrgTime1 and the storage number ArraySize1 that the first ECU 100 desires to set when executing engine control tasks. Note that, like the first embodiment, the AD trigger cycle setting task can be executed by the time management ECU when it is initialized.

Figure 16:
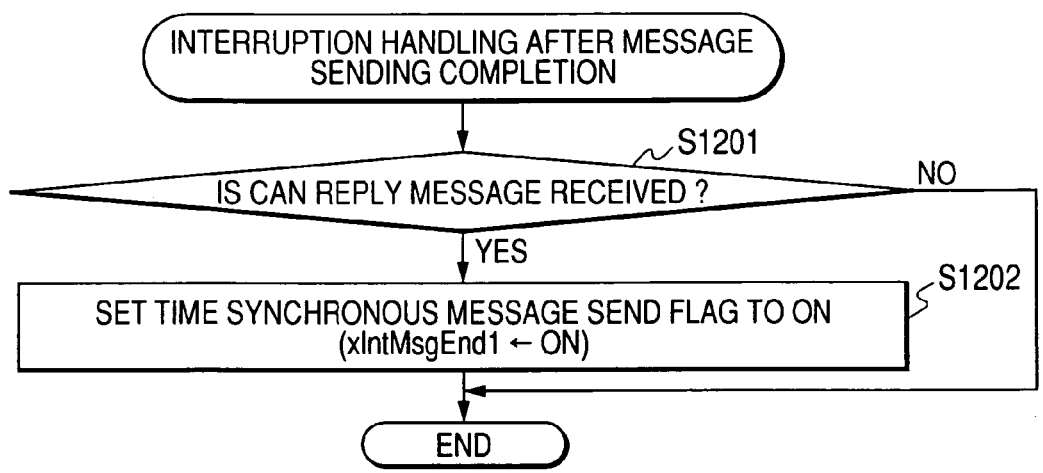
FIG. 16 is a flowchart schematically illustrating an interruption handling routine to be executed by an MPU of a time management ECU after completion of sending a time synchronous message to each of a first ECU and a second ECU according to the second embodiment.

After completion of sending the time synchronous message to both the first ECU 100 and the second ECU 200, the time management ECU 300 executes an interruption handling routine illustrated in FIG. 16.

As illustrated in FIG. 16, the time management ECU 300 determines whether the CAN reply message is sent from each of the first ECU 100 and the second ECU 200 thereto in step S1201. If it is determined that no reply messages are sent to the time management ECU 300 (the determination in step S1201 is NO), the time management ECU 300 exits the interruption handling routine.

Otherwise if it is determined that the CAN reply message is sent to the time management ECU 300 (the determination in step S1201 is YES), the time management ECU 300 determines that each of the first and second ECUs 100 and 200 securely has received the time synchronous message. Then, in step S1202, the time management ECU 300 sets the time synchronous message send flag xIntMsgEnd1 to the on state, and thereafter, exiting the interruption handling routine.

In the second ECU 200, the CAN receiving interruption task illustrated in FIG. 9 is executed so that the AD trigger cycle ADTrgTime1 contained in the time synchronous message is stored in the RAM 203 as the AD trigger cycle ADTrgTime2. Thereafter, in the second ECU 200, the compare interruption task illustrated in FIG. 10, the sensor-information storing task illustrated in FIG. 11, and the sending timing task illustrated in FIG. 12 are executed by the MPU 202. These tasks permit pieces of the second sensor information to be periodically obtained from the intake stroke sensor 2 at the AD trigger cycle ADTrgTime2. The pieces of the second sensor information are sent to the first ECU 100.

In the first ECU 100, a CAN receiving interruption task to be executed by the MPU 102 upon reception of a message sent via the CAN bus CB from the time management ECU 300 in the CAN protocol.

Figure 17:
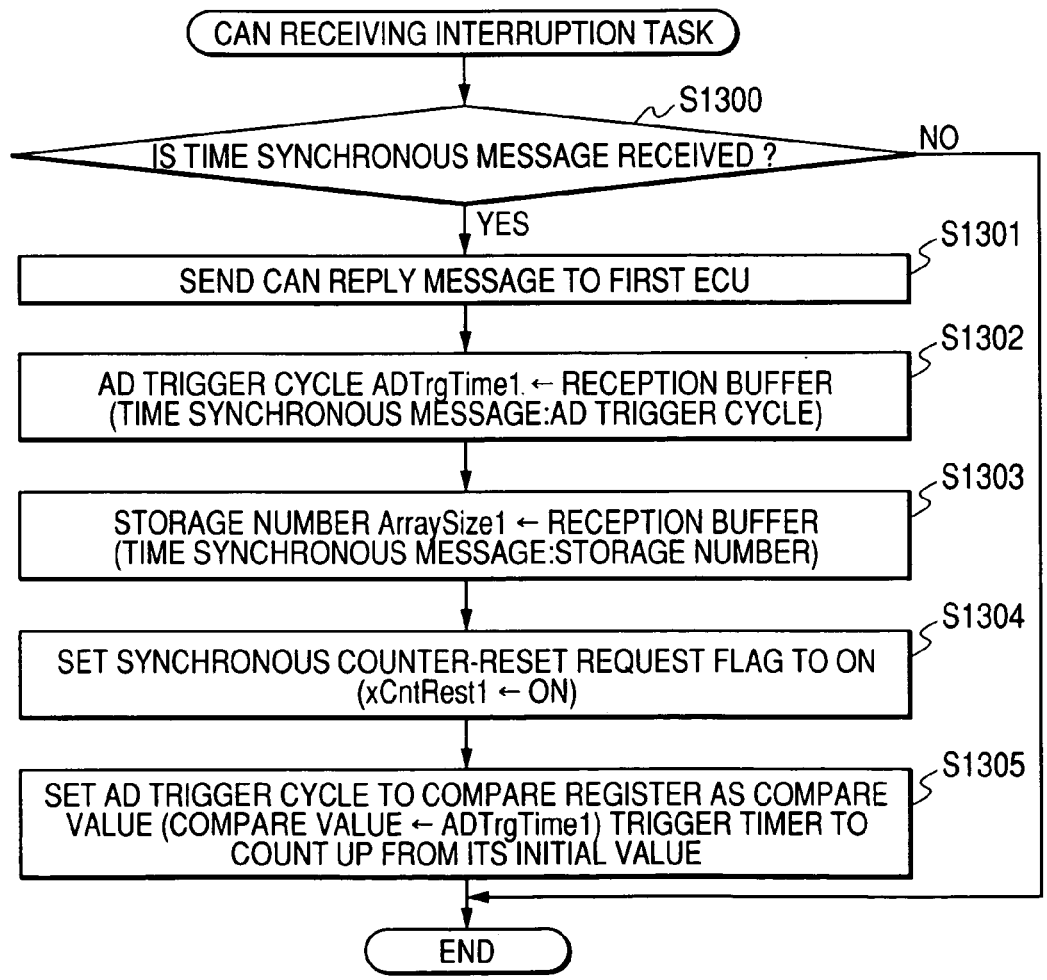
FIG. 17 is a view schematically illustrating a CAN receiving interruption task to be executed by an MPU of the second ECU upon reception of a message sent via a CAN bus from the first ECU in the CAN protocol according to the second embodiment.

Referring to FIG. 17, in step S1300, the MPU 102 determines whether the received message sent from the time management ECU 300 is the time synchronous message.

If it is determined that the received message sent from the time management ECU 300 is not the time synchronous message (the determination in step S1300 is NO), the MPU 102 exits the CAN receiving interruption task.

Otherwise if it is determined that the received message sent from the time management ECU 300 is the time synchronous message (the determination in step S1300 is YES), in step S1301, the MPU 202 controls the communications controller 108 to send, to the first ECU 100, the CAN reply message indicative of the receipt of the time synchronous message. Subsequently, in step S1302, the MPU 102 reads out the AD trigger cycle ADTrgTime1 contained in the time synchronous message stored in the reception buffer 110 to store it in the RAM 103.

Next, in step S1303, the MPU 102 reads out the storage number ArraySize1 contained in the time synchronous message to store it in the RAM 103.

Subsequently, in step S1304, a synchronous counter-reset request flag xCntRest1 is set to the on state. Next, in step S1305, in response to the sending timing of the time synchronous message, the AD trigger cycle ADTrgTime1 is set to the compare register 106 as the compare value, and triggers the timer 107 to count up from its initial value (e.g. 0). This allows the compare register 106 to generate an interruption every time the AD trigger cycle ADTrgTime1 has elapsed.

Thereafter, the compare interruption task illustrated in FIG. 5, the sensor-information storing task illustrated in FIG. 6, the CAN receiving task illustrated in FIG. 8, and the intake air mass control task illustrated in FIG. 13 are executed by the MPU 102.

As described above, in the second embodiment, in addition to the effect (5) obtained in the first embodiment, the vehicle control system VC1 can obtain the following effects:

(6) Through the time synchronous message sent from the time management ECU 300, the trigger timing to get a piece of the first sensor information and that of the second sensor information is sent to the first and second ECUs 100 and 200. This allows a timing to obtain a piece of the first sensor information and that to obtain a piece of the second sensor information to be synchronized with the AD trigger cycle ADTrgTime1, making it possible to ensure the synchronism between the pieces of the first sensor information and those of the second sensor information.

The ensuring of synchronism between the pieces of the first sensor information and those of the second sensor information allows for execution of balanced control with high accuracy, which is associated with the vehicle, based on the pieces of the first sensor information and those of the second sensor information. This allows the load of the first ECU 100 to be reduced; this load is required for the first ECU 100 to execute the engine intake air mass control based on the pieces of the first sensor information and those of the second sensor information.

(7) The time management ECU 300 is configured to send the AD trigger cycle ADTrgTime1 for instructing the cycle at which a piece of the first sensor information is obtained while it is contained in the time synchronous message to each of the first ECU 100 and the second ECU 200. This allows the first and second ECUs 100 and 200 to obtain the first sensor information and the second sensor information at the same AD trigger cycle ADTrgTime1.

After sending of the time synchronous message to each of the first and second ECUs 100 and 200, a piece of the second sensor information is sent from the second ECU 200 to the first ECU 100 at the same cycle. Specifically, it is unnecessary for the time management ECU 300 to periodically send the time synchronous message to each of the first and second ECUs 100 and 200, making it possible to simplify the processes of the time management ECU 300. In addition, in the second embodiment, the timing ID indicative of the time at which a piece of the second sensor information was obtained is sent to the first ECU 100 together with a piece of the second sensor information. This allows for easy handling of pieces of the second sensor information.

(8) The time management ECU 300 is configured to send, to each of the first and second ECUs 100 and 200, the storage number ArraySize1 representing a predetermined number of pieces of the first sensor information that the first ECU 100 should get and that of the second sensor information that the second ECU 200 should get. The storage number ArraySize1 is sent to each of the first and second ECUs 100 and 200 while it is contained in the time synchronous message.

This allows the first ECU 100 to get a series of pieces of the first sensor information and the second ECU 200 to get a series of pieces of the second sensor information. The number of the pieces of each of the first sensor information and the second sensor information is equivalent to the storage number ArraySize1.

This allows the first ECU 100 to store therein a desired number of pieces of each of the first sensor information and the second sensor information, which corresponds to a desired time range and are set in accordance with the intended use during engine control, such as engine intake air mass control. This makes it possible to expand the versatility of the vehicle control system VC1. The first ECU 100 can store therein a series of historical pieces of each of the fist sensor information and the second sensor information; this number of the historical pieces corresponds to the storage number ArraySize1.

This allows the first ECU 100 to grasp change of the pieces of each of the fist sensor information and the second sensor information over time, which can contribute to the improvement of reliability of the first sensor information and second sensor information and/or control tasks to be executed by the first ECU 100.

(9) The first ECU 100, the second ECU 200, and the time management ECU 300 are communicably linked to each other via the CAN bus CB such that various items of information including the time synchronous messages and the like are communicated therebetween as CAN messages in accordance with the CAN communication protocol.

This allows the vehicle control system VC1 to be easily applicable for a conventional vehicle control system using the CAN. Specifically, the vehicle control system VC1 according to the second embodiment allows high degree of freedom for change in a conventional vehicle control system to be ensured.

Note that the vehicle control system VC1 according to the second embodiment can be modified, for example, as follows:

Specifically, the time management ECU 300 can periodically send the time synchronous message after sending the time synchronous message when the time management ECU 300 was initialized, or can periodically sent the synchronous message desired timings except for the initializing timing.

This modification allows for periodical correction of the gaps between the timings at which pieces of the first sensor information were obtained and the corresponding timings at which pieces of the second sensor information were obtained.

This makes it possible to further improve the reliability of the synchronism of the first sensor information and the second sensor information. In contrast, as another modification, the time management ECU 300 can non-periodically send the time synchronous message. This allows the time management ECU 300 to send the time synchronous message only if the synchronism between the first sensor information and the second sensor information is required in the conduct of engine control. This makes it possible to reduce the load of the time management ECU 300.

In the second embodiment, a series of four pieces of the first sensor information, which correspond to the storage number ArraySize1 of "4", is stored in the first ECU 100, and a series of four pieces of the second sensor information, which correspond to the storage number ArraySize1 of "4", is stored in the second ECU 200. The storage number ArraySize1 can be set to a desired number corresponding to a desired time range accordingly. For example, even if the storage number ArraySize1 is set to "1", it is possible to achieve a basic object for ensuring the synchronism between the first sensor information and the second sensor information.

In each of the first and second embodiments, the vehicle control system VC1 is configured such that pieces of the second sensor information obtained by the second ECU 200 is supplied therefrom to the first ECU 100 programmed to execute the intake air mass control that requires the synchronism between pieces of the first sensor information and those of the second sensor information. If another ECU programmed to execute at least one of various controls associated with the vehicle based on pieces of the first sensor information and those of the second sensor information between which the synchronism is established, the first sensor information and the second sensor information can be directed to another ECU.

Specifically, the ensuring of synchronism between the pieces of the first sensor information and those of the second sensor information allows another ECU to execute balanced control with high accuracy, which is associated with the vehicle, based on the pieces of the first sensor information and those of the second sensor information.

In sum up, in each of the first and second embodiments, destination of pieces of the first sensor information and those of the second sensor information between which the synchronism is established based on the time synchronous message can be freely determined.

In each of the first and second embodiments, each of the ECUs are communicably linked to each other via the CAN bus. In the present invention, another network using another communications protocol can be used in place of the CAN bus. For example, the present invention can be applied to a distributed control system whose ECUs are communicably linked to each other via an other network, such as a LIN (Local Interconnect Network) bus network.

In each of the first and second embodiments, the present invention is applied to a vehicle control system designed to execute engine intake air mass control based on the first sensor information obtained from the intake throttle-position sensor 1 and the second sensor information obtained from the intake stroke sensor 2 between which synchronism is established. The present invention however is not limited to the application. Specifically, the present invention can be applied to a distributed control system that requires a plurality of items of sensor information between which synchronism can be ensured, such as a distributed control system used for control of large working machines.

Some of the elements constituting each of the ECUs according to the first and second embodiments and their modifications can be independently provided from a microcomputer.

In each of the first and second embodiments and their modifications, the elements provided in the microcomputer can be implemented as dedicated hardware devices, such as custom LSI (Large-Scale Integration) circuits.

In each of the first and second embodiments, as the timing ID the count value of the synchronous counter is used. In the present invention, real time information that is measured by, for example, a real time clock of a MPU or a crystal oscillator can be used as the timing ID.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A distributed control system comprising:
 a first electronic control unit connected to a first sensor and configured to obtain first sensor information therefrom for execution of allocated control; and
 a second electronic control unit connected to a second sensor and configured to obtain second sensor information therefrom for execution of allocated control, the first and second electronic control units being communicably linked to each other,
 the first electronic control unit being configured to send trigger information to the second electronic control unit, the trigger information including a timing that triggers the second electronic unit to obtain the second sensor information from the second sensor,
 the second electronic control unit being configured to:
 receive the trigger information;
 obtain, at the timing of the trigger information, the second sensor information from the second sensor; and
 send, to the first electronic control unit, the obtained second sensor information.

2. A distributed control system according to claim 1, wherein the timing of the trigger information is configured to trigger the first electronic control unit to obtain the first sensor information.

3. A distributed control system according to claim 1, wherein the timing included in the trigger information represents a predetermined cycle, and the second electronic control unit is configured to:
 obtain a piece of the second sensor information from the second sensor every predetermined cycle; and
 send, to the first electronic control unit, the obtained pieces of the second sensor information together with timing identifiers, the timing identifiers temporally identifying the pieces of the second sensor information, respectively.

4. A distributed control system according to claim 3, wherein the first electronic control unit is configured to:
 obtain a piece of the first sensor information from the first sensor every predetermined cycle;
 obtain timing identifiers temporally identifying the pieces of the first sensor information, respectively;
 receive the pieces of the second information together with the timing identifiers, respectively; and
 store the pieces of the first information and those of the second information such that the pieces of the first information are associated with those of the second information based on the timing identifiers of the pieces of the first information and those of the pieces of the second information.

5. A distributed control system according to claim 1, wherein the trigger information includes a predetermined obtaining number, and the second electronic control unit is configured to:
 obtain a number of pieces of the second sensor information from the second sensor according to the timing, the number of pieces of the second sensor information corresponding to the obtaining number; and
 send, to the first electronic control unit, a series of the obtained pieces of the second sensor information together with timing identifiers, the timing identifiers temporally identifying the pieces of the second sensor information, respectively.

6. A distributed control system according to claim 5, wherein the first electronic control unit is configured to:
 obtain a number of pieces of the first sensor information from the first sensor according to the timing, the number of pieces of the first sensor information corresponding to the obtaining number;
 obtain timing identifiers temporally identifying the pieces of the first sensor information, respectively;
 receive the series of the obtained pieces of the second information together with the timing identifiers, respectively; and
 store a series of the obtained pieces of the first information and that of the obtained pieces of the second information such that the pieces of the first information are associated with those of the second information based on the timing identifiers of the pieces of the first information and those of the pieces of the second information.

7. A distributed control system according to claim 1, wherein the first electronic control unit is configured to periodically send the trigger information to the second electronic control unit.

8. A distributed control system according to claim 1, wherein the first electronic control unit is configured to non-periodically send the trigger information to the second electronic control unit.

9. A distributed control system according to claim 1, wherein the first and second electronic control units are communicably linked to each other via a CAN bus such that the trigger information is sent from the first electronic control unit to the second electronic control unit via the CAN bus as a CAN message.

10. A distributed control system according to claim 1, wherein the distributed control system is installed in a vehicle, the first sensor is an intake throttle-position sensor configured to monitor information representing throttle position of an intake throttle of an engine installed in the vehicle, and the second sensor is an intake stroke sensor configured to monitor stroke volume of an intake valve installed in the vehicle.

11. A distributed control system comprising:
 a first electronic control unit connected to a first sensor and configured to obtain first sensor information therefrom for execution of allocated control;

a second electronic control unit connected to a second sensor and configured to obtain second sensor information therefrom for execution of allocated control; and a third electronic control unit for managing timings between the first and second electronic control units, the first, second and third electronic control units being communicably linked to each other, the third electronic control unit being configured to send trigger information to each of the first and second electronic control units, the trigger information including a timing that triggers the first electronic unit to obtain the first sensor information from the first sensor and that triggers the second electronic unit to obtain the second sensor information from the second sensor, the first electronic control unit being configured to:

receive the trigger information; and obtain, at the timing of the trigger information, the first sensor information from the first sensor, the second electronic control unit being configured to:

receive the trigger information; and obtain, at the timing of the trigger information, the second sensor information from the second sensor.

12. A distributed control system according to claim 11, wherein the trigger information includes destination information indicative of at least one of the first to third electronic control unit as destination of each of the first and second sensor information, and each of the first and second electronic control unit is configured to send the obtained first sensor information and the second sensor information to at least one of the first to third electronic control units except for itself, the at least one of the first to third electronic control unit being indicated by the destination information.

13. A distributed control system according to claim 12, wherein the destination information is indicative of the first electronic control unit as destination of the second sensor information.

14. A distributed control system according to claim 13, wherein the timing included in the trigger information represents a predetermined cycle, the first electronic control unit is configured to obtain a piece of the first sensor information from the first sensor every predetermined cycle, and the second electronic control unit is configured to:

obtain a piece of the second sensor information from the second sensor every predetermined cycle;

obtain a piece of the second sensor information from the second sensor every predetermined cycle; and send, to the first electronic control unit, the obtained pieces of the second sensor information together with timing identifiers, the timing identifiers temporally identifying the pieces of the second sensor information, respectively.

15. A distributed control system according to claim 13, wherein the trigger information includes a predetermined obtaining number, the first electronic control unit is configured to obtain a number of pieces of the first sensor information from the first sensor according to the timing, the number of pieces of the first sensor information corresponding to the obtaining number, and the second electronic control unit is configured to:

obtain a number of pieces of the second sensor information from the second sensor according to the timing, the number of pieces of the second sensor information corresponding to the obtaining number; and send, to the first electronic control unit, a series of the obtained pieces of the second sensor information together with timing identifiers, the timing identifiers temporally identifying the pieces of the second sensor information, respectively.

16. A distributed control system according to claim 11, wherein the third electronic control unit is configured to periodically send the trigger information to each of the fist and second electronic control units.

17. A distributed control system according to claim 11, wherein the third electronic control unit is configured to non-periodically send the trigger information to each of the first and second electronic control units.

18. A distributed control system according to claim 11, wherein the first, second and third electronic control units are communicably linked to each other via a CAN bus such that the trigger information is sent from the third electronic control unit to each of the first and second electronic control units via the CAN bus as a CAN message.

19. A distributed control system according to claim 11, wherein the distributed control system is installed in a vehicle, the first sensor is an intake throttle-position sensor configured to monitor information representing throttle position of an intake throttle of an engine installed in the vehicle, and the second sensor is an intake stroke sensor configured to monitor stroke volume of an intake valve installed in the vehicle.

* * * * *